US012792897B1

(12) United States Patent
Kim et al.

(10) Patent No.: US 12,792,897 B1

(45) Date of Patent: Nov. 10, 2026

(54) LOW-POWER NEURAL PROCESSING UNIT BASED ON PROCESSING ELEMENT PAIR CAPABLE OF PARALLEL OPERATIONS

(71) Applicant: DEEPX CO., LTD., Seongnam-si (KR)

(72) Inventors: Hyung Suk Kim, Seongnam-si (KR); Ho Chul Lee, Gwangmyeong-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/533,113

(22) Filed: Feb. 7, 2026

(30) Foreign Application Priority Data

Dec. 22, 2025 (KR) ........................ 10-2025-0206679

(51) Int. Cl.
*G06N 3/063* (2023.01)
*G06F 17/16* (2006.01)

(52) U.S. Cl.
CPC ............. *G06N 3/063* (2013.01); *G06F 17/16* (2013.01)

(58) Field of Classification Search
CPC ........... G06N 3/063; G06F 17/16; G06F 7/57; G06F 7/575
See application file for complete search history.

(56) References Cited

U.S. PATENT DOCUMENTS

| | | | | |
|---|---|---|---|---|
| 2019/0236049 A1* | 8/2019 | Vantrease | ............... | G06F 17/15 |
| 2020/0184320 A1* | 6/2020 | Croxford | ............... | G06N 3/048 |
| 2024/0094986 A1* | 3/2024 | Lyubomirsky | .......... | G06F 17/16 |
| 2024/0211431 A1* | 6/2024 | Kim | .......................... | G06F 1/08 |

* cited by examiner

*Primary Examiner* — Emily E Larocque

(74) *Attorney, Agent, or Firm* — INVENSTONE PATENT, LLC

(57) ABSTRACT

A system-on-chip (SoC) for an artificial intelligence inference operation includes a neural processing unit (NPU) for performing a matrix multiplication operation based on at least one processing element (PE) pair, a host processor for controlling the NPU, a clock generator for generating a master clock signal for an operation of the system-on-chip, and a clock divider for dividing the master clock signal frequency to generate a divided clock signal to be supplied to the neural processing unit or the host processor. The PE pair includes a first PE and a second PE for performing an operation in parallel in synchronization with an operation of the first PE, the first and second PEs sharing first input data with each other. The first PE performs an operation of the first input data and second input data, and the second PE performs an operation of the first input data and third input data.

9 Claims, 22 Drawing Sheets

| Operation | Energy(PJ) |
|---|---|
| 8b Add | 0.03 |
| 16b Add | 0.05 |
| 32b Add | 0.1 |
| 16b FP Add | 0.4 |
| 32b FP Add | 0.9 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

LOW-POWER NEURAL PROCESSING UNIT BASED ON PROCESSING ELEMENT PAIR CAPABLE OF PARALLEL OPERATIONS

CROSS-REFERENCE TO RELATED APPLICATIONS

This application claims the priority of Korean Patent Application No. 10-2025-0206679 filed on Dec. 22, 2025, in the Ministry of Intellectual Property of the Republic of Korea, the disclosure of which is incorporated herein by reference.

BACKGROUND OF THE DISCLOSURE

Technical Field

The present disclosure relates to an electronic device, and more specifically, to a low-power neural processing unit based on a processing element pair capable of parallel operations.

Background Art

As neural network technology develops, the application of neural network inference services utilizing big data-based training is becoming increasingly diverse. These inference services train neural networks on vast datasets and consequently can infer diverse and complex data through learned models. However, as the functions and accuracy required for neural network inference services continue to increase, the parameter size, computational complexity, and memory bandwidth demands of neural network models are increasing exponentially.

Consequently, performance requirements for processors and memories capable of supporting these inference tasks are also rising. To address these demands, neural network inference services are increasingly being deployed on cloud computing-based servers that provide efficient processing functions for large-scale data tasks.

Generative artificial intelligence models are increasingly being developed to operate in various environments. These models include various neural network models such as language models for interactive systems, stable diffusion models that generate images from text inputs, and transformer models that predict and determine future activities based on a series of events in specific situations. The computational cost of generating a response to an input query based on these generative artificial intelligence models is very high. For example, among generative artificial intelligence models, the commercialization of large language models (LLMs) has begun in earnest.

Generative artificial intelligence models are very diverse, and new models are continuously being released into the market. Representative generative artificial intelligence models include, for example, GPT, LLAMA, DeepSeek, Mistral, DBRX, Qwen, Nova, Jamba, PaLM, PanGu, OPT, Gemini, Falcon, BLOOM, CLIP, ROBERTa, ALBERT, ELECTRA, LXNet, BERT, BART, CTRL, DALL E, Stable Diffusion, Midjourney, Imagen, DeepFloyd, Runway Gen, DreamBooth, StyleGAN, BigGAN, Sora, Pika Labs, Stable Video Diffusion, Imagen Video, Make-A-Video, Phenaki, Dreamix, VideoPoet, Text2Video-Zero, CogVideo, and the like.

Recently, due to the spread of generative artificial intelligence services including large language models (LLMs), the demand for high-performance general-purpose graphics processing units (GPGPUs) is surging. However, the total power consumption of GPGPUs operating globally for such LLM processing has already reached a level comparable to the total power consumption of some countries, and excessive energy demand is emerging as a serious problem for the commercialization of LLMs. In particular, the evaluation of power plant capacity to stably supply the energy required when constructing GPGPU-based data centers is essential, and this becomes a major barrier making the widespread deployment of large-scale AI models difficult in many urban areas.

To address these energy and deployment issues, on-device AI semiconductor technology that processes artificial intelligence (AI) models on edge devices is attracting attention. Since on-device inference is performed in a limited power environment, low-power optimization is an essential prerequisite for hardware design. Conventionally, techniques such as quantization technology that lowers operation precision, pruning technology that omits unnecessary operations, and clock gating at the hardware level have mainly been attempted for low-power implementation.

SUMMARY OF THE DISCLOSURE

Among deep neural networks (DNNs), a transformer artificial neural network is a DNN based on an attention technology. The transformer utilizes a large number of matrix multiplication operations. The transformer may obtain an attention score (Q, K, V), which is an operation value, using an input value and parameters such as a query (Q), a key (K), and a value (V). The transformer may process various inference operations based on the operation value (e.g., the attention score (Q, K, V)). The transformer shows excellent performance in the field of generative artificial intelligence.

The transformer is being utilized in various large language models. For example, a language model receives a query in a text form and generates a response. The response generated by the language model may be generated by inputting tokens generated as part of the response generated by the language model back into the language model. The response generation cost of such a language model is proportional to the number of parameters of the language model and a bit-width representing each parameter. Therefore, the calculation cost required to generate a response using a language model having a large number of parameters or a large parameter bit-width is high. Conversely, reducing the parameter bit-width can lower the calculation cost and improve the response speed, but a problem may occur in that the quality of the generated response deteriorates.

Along with the calculation cost problem as described above, a problem of structural inefficiency of a processing element or PE, which is a core operation block of a high-performance neural processing unit (NPU), is emerging. In particular, in order to lower the memory bandwidth demand of a large language model (LLM) and increase an inference speed, low-precision integer operations that quantize parameters to a low bit-width of eight bits or less, and a mixed precision technique that applies different bit-widths to weights and activation input data are essentially utilized.

However, a conventional processing core structure entails the following technical limitations and inefficiencies.

First, a large number of pipeline registers are required to secure stable timing at a high-frequency clock, and this becomes a major factor increasing the area and power consumption of the processing core. Although power can be reduced by lowering the clock frequency, in this case, a problem occurs in that the operation throughput decreases together.

Second, in a single PE structure, it is difficult to efficiently utilize the parallelism of columns or channels of a matrix operation, and even though identical activation values or weight data are repeatedly used in several operation steps, a data reuse mechanism is not sufficiently implemented, leading to high memory bandwidth requirements and increased power consumption.

Third, despite the possibility of applying a systolic operation flow, a data transfer structure between PEs is inefficiently implemented, so there is a problem in that hardware resources required for a continuous PE group to sequentially process the same weight are excessively generated, or unnecessary memory accesses are repeated.

In this background, the inventors of the present disclosure have proposed a structure that secures an operation throughput similar to that of a high-frequency single PE by configuring processing elements in a pair structure and allowing two PEs to operate in parallel in an environment where the frequency of a master clock is lowered to half for half-frequency operation. By lowering the clock frequency, pipeline registers inside a multiply-accumulate tree can be removed, thereby reducing area and power consumption. In addition, by applying an intra-PE-pair reuse structure that shares input data (src0) inside a PE pair and applying an inter-PE-pair reuse structure that transfers and uses a weight (src1) between PE pairs, memory access volume can be suppressed and power consumption can be significantly reduced even if the number of PEs increases. As used herein, intra-PE-pair operation refers to data reuse or processing performed between processing elements within the same PE pair, and inter-PE-pair operation refers to data transfer or reuse between different PE pairs.

Accordingly, a problem to be solved by the present disclosure is to provide a parallel processing element pair structure capable of achieving high operation throughput even at a low clock frequency, reduce memory bandwidth requirements and power consumption through data reuse inside PEs and between PEs, and provide a neural processing unit and an operation method thereof capable of improving power, performance, and area (PPA) efficiency compared to inference performance of a large-scale artificial neural network-especially a transformer-based LLM.

However, the problems of the present disclosure are not limited to the above-mentioned contents, and those skilled in the art will be able to clearly understand additional problems that the present disclosure intends to achieve through the following description.

A system-on-chip (SoC) for an artificial intelligence inference operation is disclosed. The system-on-chip according to the present disclosure may include a neural processing unit for performing a matrix multiplication operation based on at least one processing element (PE) pair, a host processor for controlling the neural processing unit, a clock generator for generating a master clock for an operation of the system-on-chip, and a clock divider for dividing the master clock and supplying the divided clock to the neural processing unit or the host processor. The processing element pair may include a first processing element and a second processing element for performing an operation in parallel in synchronization with an operation of the first processing element. Further, the first processing element and the second processing element may share first input data with each other, the first processing element may be configured to perform an operation of the first input data and second input data, and the second processing element may be configured to perform an operation of the first input data and third input data.

The second input data and the third input data may be transferred to another processing element pair and used for an operation in the other processing element pair.

The first processing element may receive data belonging to an Nth column among weight matrices of an artificial neural network as input data, and the second processing element may receive data belonging to an (N+1)th column among the weight matrices of the artificial neural network as input data, where N is an integer greater than or equal to zero.

The clock divider may provide a half clock obtained by lowering a frequency of the master clock by half to the neural processing unit in order to reduce power consumption of the neural processing unit, whereby the processing element pair operates based on the half clock, and the first processing element and the second processing element may be synchronized by the processing element pair to operate simultaneously, thereby reducing a decrease in operation speed.

The neural processing unit may include a controller for controlling a neural network operation, a processing core performing a MAC operation based on the at least one PE pair under control of the controller, and a special function unit (SFU) for performing at least one of square root, normalization, softmax, quantization, and dequantization operations that are not processed in the processing core.

A clock having the same frequency as the master clock may be supplied to the controller and the special function unit, and a half clock may be supplied to the processing core. In addition, a clock frequency provided to the neural processing unit may be 600 MHz.

A processing core included in a neural processing unit for performing a matrix multiplication operation is also disclosed. The processing core may include a plurality of processing element (PE) pairs including a first processing element pair and a second processing element pair. The first processing element pair may include a first processing element for performing a multiplication operation of first input data and second input data and a second processing element for performing a multiplication operation of the first input data and third input data in parallel with the first processing element. The first processing element pair may further include a first source buffer for loading the first input data, and the first source buffer may be shared by the first processing element and the second processing element. The first processing element may include a second source buffer for loading the second input data, and the second processing element may include a third source buffer for loading the third input data.

The second processing element pair may include a third processing element for performing a multiplication operation of fourth input data and fifth input data and a fourth processing element for performing a multiplication operation of the fourth input data and sixth input data in parallel with the third processing element. The second processing element pair may further include a fourth source buffer for loading the fourth input data, and the fourth source buffer may be shared by the third processing element and the fourth processing element. The third processing element may include a fifth source buffer for loading the fifth input data, and the fourth processing element may include a sixth source buffer for loading the sixth input data.

The fifth source buffer may receive the second input data stored in the second source buffer and store the received data as the fifth input data, and the sixth source buffer may receive the third input data stored in the third source buffer and store the received data as the sixth input data.

The first input data may be an activation value, and the second input data and the third input data may be weight values of an artificial neural network.

The first input data may be at least one value corresponding to an Nth row of a first operand data matrix composed of activation values of an 8-bit format, the second input data may be at least one value corresponding to an Mth column of a second operand data matrix composed of weight values of a 4-bit or 8-bit format, and the third input data may be at least one value corresponding to a column adjacent to the Mth column of the second operand data matrix.

According to the present disclosure, the following effects can be achieved.

First, a high operation throughput can be secured even at a low clock frequency.

The present disclosure configures a processing element PE in a pair structure rather than a single structure, allowing two PEs to operate in parallel even in an environment where a master clock frequency is lowered (by half) to achieve half-frequency operation. Through this, it is possible to maintain a throughput level substantially equivalent to that of a high-frequency based single PE structure, and in particular, it provides an advantage of performing operations without degrading an inference speed in a neural network having a large amount of computation such as a transformer-based large language model (LLM).

Second, an increase in hardware area can be minimized and power consumption can be efficiently reduced. Although the present disclosure is a structure that increases the number of PEs to two, one or more pipeline registers existing inside a multiply-accumulate tree can be removed due to the half-frequency operation, resulting in fewer pipeline registers (register stages) than when operated based on the master clock signal, and an increase in area can be suppressed to less than twice (less than a doubled area) by sharing an input data buffer within a PE pair. In addition, as the circuit operates at a low clock frequency, switching power of the circuit decreases, and static and dynamic power saving effects due to a reduction in the number of pipeline registers occur in combination. In particular, since throughput is maintained while the area increase is less than twice, there is an advantage in that overall power efficiency is significantly improved.

Third, data reuse can be maximized to reduce memory bandwidth requirements and additionally lower power consumption.

The present disclosure provides a structure in which a buffer is shared inside a PE pair, so that the same activation value can be reused without repeatedly loading it from a memory, and an increase in hardware resources can be minimized through buffer sharing even though the processing element is a pair structure. In addition, by applying a structure in which weight data is transferred and used between adjacent PE pairs, the same weight can be efficiently reused in a continuous operation flow. Such a reuse mechanism significantly reduces the number of memory accesses to reduce power consumption, while effectively alleviating a memory bandwidth problem, which is a bottleneck factor of a large-scale neural network.

Fourth, a power, performance, and area (PPA) ratio is improved overall.

The present disclosure provides a balanced efficiency improvement in terms of power, performance, and area through a series of structural improvements such as a half-frequency based low-power structure, area optimization by pipeline resource reduction, throughput maintenance by PE pair parallel operation, and memory access reduction through data reuse. Such comprehensive improvements have the effect of dramatically improving the PPA ratio of the entire artificial intelligence inference system.

The effects according to the present disclosure are not limited by the contents exemplified above, and more various effects may be derived according to the technical configuration of the present disclosure.

DETAILED DESCRIPTION OF THE PRESENT DISCLOSURE

Figure 1:
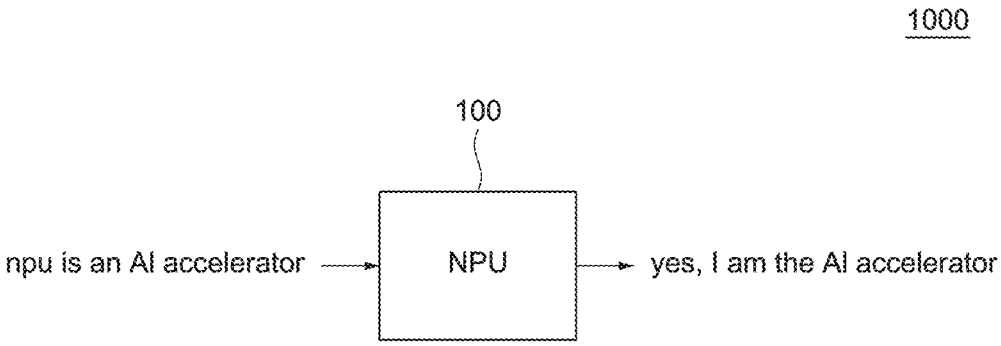
FIG. 1 is a block diagram illustrating a neural processing unit for processing a language model according to an example of the present disclosure.

Specific structural or step-by-step descriptions for examples according to the concept of the present disclosure disclosed in the present disclosure are merely exemplified for the purpose of explaining examples according to the concept of the present disclosure.

Examples according to the concept of the present disclosure may be modified in various ways. The present disclosure may have various forms. Therefore, specific examples are illustrated in the drawings and described in detail in the present disclosure. However, this is not intended to limit examples according to the concept of the present disclosure to a specific disclosed form. Therefore, all modifications, equivalents, or substitutes included in the spirit and technical scope of the present disclosure should be understood as being included in the present disclosure.

Terms such as first and/or second may be used to describe various components. However, the present disclosure should not be limited by the terms.

The terms are used only for the purpose of distinguishing one component from another component. For example, without departing from the scope of rights according to the concept of the present disclosure, a first component may be named a second component, and similarly, a second component may also be named a first component.

When a component is referred to as being "connected" or "accessed" to another component, it should be understood that it may be directly connected or accessed to the other component, but other components may exist in between. On the other hand, when a component is referred to as being "directly connected" or "directly accessed" to another component, it should be understood that no other component exists in between.

Other expressions describing the relationship between components, that is, "between" and "immediately between" or "neighboring to" and "directly neighboring to," should be interpreted similarly.

In this document, expressions such as "A or B," "at least one of A or/and B," or "one or more of A or/and B" may include all possible combinations of the listed items. For example, "A or B," "at least one of A and B," or "at least one of A or B" may refer to all cases including (1) at least one A, (2) at least one B, or (3) both at least one A and at least one B.

Expressions such as "first," "second," "1st," or "2nd" used in the present disclosure may modify various components regardless of order and/or importance. The expressions are used only to distinguish one component from another component and do not limit the corresponding components. For example, a first user device and a second user device may represent different user devices regardless of order or importance. For example, without departing from the scope of rights described in this document, a first component may be named a second component, and similarly, a second component may also be renamed a first component.

Terms used in the present disclosure are used only to describe specific embodiments and may not be intended to limit the scope of other examples.

Singular expressions may include plural expressions unless the context clearly indicates otherwise. Terms used herein, including technical or scientific terms, may have the same meaning as generally understood by those of ordinary skill in the art described in this document.

Terms defined in a general dictionary among terms used in the present disclosure may be interpreted as having the same or similar meaning as the meaning in the context of the related art. Unless explicitly defined in this document, terms used in the present disclosure are not interpreted in an ideal or excessively formal sense. In some cases, even terms defined in this document cannot be interpreted to exclude embodiments of this document.

The terms used in the present disclosure are used only to describe specific embodiments and are not intended to limit the present disclosure.

Singular expressions include plural expressions unless the context clearly indicates otherwise. In the present disclosure, terms such as "include" or "have" are intended to designate that a described feature, number, step, operation, component, part, or combination thereof exists. Therefore, it should be understood that the possibility of the existence or addition of one or more other features or numbers, steps, operations, components, parts, or combinations thereof is not excluded in advance.

Unless defined otherwise, all terms used herein, including technical or scientific terms, have the same meaning as generally understood by those of ordinary skill in the technical field to which the present disclosure belongs. Terms such as those defined in generally used dictionaries should be interpreted as having a meaning consistent with the meaning in the context of the related art. Unless explicitly defined in the present disclosure, they are not interpreted in an ideal or excessively formal sense.

Each feature of the various examples of the present disclosure may be combined or combined with each other partially or entirely. Various examples of the present disclosure are technically capable of various interworking and driving, as those skilled in the art can fully understand. Each example of the present disclosure may be implemented independently of each other or may be implemented together in a related relationship.

In describing each example, descriptions of technical contents that are well known in the technical field to which the present disclosure belongs and are not directly related to the present disclosure may be omitted. This is to more clearly convey the gist of the present disclosure without obscuring the gist of the present disclosure by omitting unnecessary descriptions.

In the present disclosure, a "unit" may refer to a hardware module or a hardware circuit. As an example, a unit may be a hardware circuit for performing a specific function. However, a unit does not necessarily mean a dedicated circuit physically separated from other circuits to perform only the corresponding function. A unit may be configured based on a plurality of circuits, and these circuits may exist in different locations and perform a specific function by interworking under a control signal. As an example, a "unit A" and a "unit B" may include at least some common electronic circuits.

In the present disclosure, an "artificial intelligence model" may include not only a generative AI model but also a traditional AI model that performs judgment, classification, prediction, and the like. The artificial intelligence model may include a language model, a model for reading an image or video, and the like, and any model that generates output data from input data using an artificial neural network may correspond to an artificial intelligence model. As an example, an artificial intelligence model may generate output text from input text. An artificial intelligence model may classify input data or generate prediction data from input data. An artificial intelligence model may search for or track an object of interest from an image or video. An artificial intelligence model may analyze an image or video to perform situation judgment. An artificial intelligence model may generate an image/video corresponding to input text based on the input text. An artificial intelligence model may generate output text describing an input image/video from the input image/video. Input data and output data may be text, voice signals, images, videos, etc., respectively, and are not limited in type.

An artificial intelligence model may be implemented as an artificial neural network, and as a representative embodiment, processing or operation of an artificial intelligence model may include various operations performed within a calculation graph of a neural network. These operations may include not only layers containing weight parameters (Dense, Conv, etc.) but also operations having no parameters or only a limited number of parameters, such as softmax and RMS-Normalization (RMS Norm).

A "transformer" is an artificial intelligence model implemented based on an attention mechanism and may be used in a language model (large language model, LLM, or small LLM). Language models include BERT (Bidirectional Encoder Representations from Transformers), GPT (Generative Pre-trained Transformer), ROBERTa (Robustly Optimized BERT Pretraining Approach), ALBERT (A Lite BERT), ELECTRA (Efficiently Learning an Encoder that Classifies Token Replacements Accurately), Transformer-XL (Transformer with Extra Long Context), XLNet (a model combining advantages of GPT and BERT), BART (Bidirectional and Auto-Regressive Transformers), CTRL (Conditional Transformer Language), T5 (Text-to-Text Transfer Transformer), LaMDA (Language Model for Dialogue Applications), Gopher (DeepMind's LLM), InstructGPT (GPT-3 based Fine-tuned model), PanGu (Huawei's Chinese model), PaLM (Pathways Language Model), OPT 175B (Open Pretrained Transformer 175B), BLOOM (BigScience Large Open-science Open-access Multilingual Model), HyperCLOVA (Naver's Korean hyper-scale model), and the like, and may also include new language models to appear in the future.

Hereinafter, a large-scale language model may include not only a large language model having a large number of parameters but also a small language model (SLM) having a smaller number of parameters compared to an LLM and being lightweight.

A transformer may be utilized not only in natural language processing (NLP) but also in image processing (computer vision), and representative transformer-based image models include ViT (Vision Transformer), a shifted window-based vision transformer for vision (Swin Transformer), and the like.

According to examples of the present disclosure, an apparatus, method, system, and computer-readable medium that enable a generative artificial intelligence service to operate on a device itself (also referred to as on-device) may be provided.

Generally, a transformer-based generative artificial intelligence model receives a query and generates a response. For example, a language model receives a query in a text form and generates a token. Subsequently, the query and the generated token are input back into the language model to generate a next token. This token generation operation may be repeated several times until a response to the query is completed. A token may correspond to a word or a part of a word. A response generated by a language model may include a series of tokens additionally generated by passing tokens generated as part of the response generated by the language model back through the language model.

In this specification, a "channel" refers to a set of output values generated by the same operation unit in an operation of an artificial neural network, and may correspond to, for example, a filter output of a convolutional neural network (CNN), a node output of a multilayer perceptron (MLP), or a hidden unit dimension ($d_{model}$) of a transformer-based model. That is, embedding vector elements corresponding to a hidden unit dimension size corresponding to a single token may be a channel unit, but are not limited thereto.

Hereinafter, an example of the present disclosure will be described in detail with reference to the accompanying drawings.

FIG. 1 illustrates a neural processing unit for processing a language model according to an example of the present disclosure.

Referring to FIG. 1, a computing system 1000 operates on an edge device and may infer input text data through embedding, attention, feed forward, softmax, and the like to output output tokens. Such an inference operation consists of numerous matrix multiplications and non-linear operations, and a neural processing unit (NPU) of the present disclosure enables high-speed inference through optimization of these operations.

The computing system 1000 may receive input data and generate output data. Specifically, the computing system 1000 may include an NPU 100. The computing system 1000 may further include operation units such as a CPU, a GPU, a DSP, and a memory in addition to the NPU 100. Embedding conversion for input text may be performed by the CPU or GPU. A transformed embedding vector is transferred to the NPU 100 and may be utilized for subsequent inference operations by the NPU 100. The NPU 100 may perform an inference operation of a transformer-based generative artificial intelligence model.

The NPU 100 may generate output data from input data. According to an example, the input data may be text data. The output data may be text data or image or video data. The text data consists of at least one token. For example, if text including five tokens of 'npu', 'is', 'an', 'AI', and 'accelerator' is input to the NPU 100, the NPU 100 may perform a transformer-based artificial neural network operation to output text including six tokens of 'yes', 'I', 'am', 'an', 'AI', and 'accelerator'. However, it has been described above that the computing system 1000 may process image/video data as well as text in this specification. In this embodiment, if the input data is an image, the image data may consist of at least one patch, and the patch may be converted into an embedding vector. Hereinafter, as a representative embodiment, text will be described as an example.

The artificial neural network operation of the transformer-based artificial intelligence model may be performed in an on-device manner. That is, the computing system 1000 may be included and driven on an edge device such as a mobile device like a smartphone, a camera, a CCTV, a robot, a vehicle, a drone, a home appliance, an AI assistant, or smart mobility. The edge device in the computing system 1000 does not require wired or wireless communication with the outside of the computing system 1000 for the artificial neural network operation.

The artificial neural network operation of the transformer-based artificial intelligence model may be performed based on an attention mechanism. Under the attention mechanism, each token of input data is converted into one embedding vector through an embedding process. An embedding matrix (activation value) configured by collecting embedding vectors of the tokens is converted into a query (Q), a key (K), and a value (V) matrix using matrix multiplication (MatMul) with parameters learned in advance called a query weight matrix ($W_Q$), a key weight matrix ($W_K$), and a value weight matrix ($W_V$), respectively. Thereafter, an attention score is calculated for the query (Q) through an inner product with the key (K), and this score is converted into a normalized attention weight via a softmax function. An attention output matrix may be obtained by multiplying the calculated normalized attention weight by the value matrix (V). The attention output matrix is processed by a feed-forward network after passing through residual connection and normalization, and this processing result is transferred to a final output layer and used to calculate a probability distribution of a next token.

Figure 2:
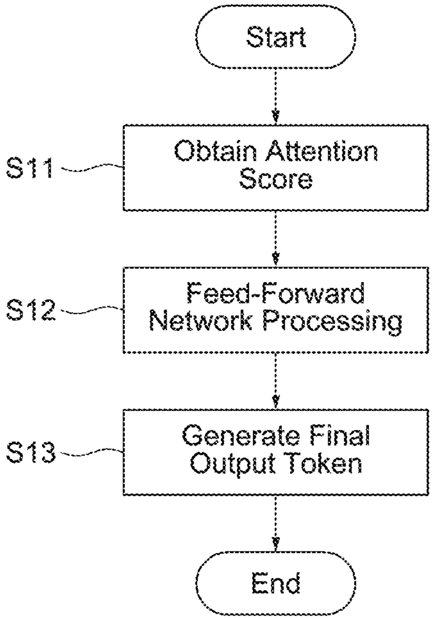
FIG. 2 is a flowchart illustrating a method of processing a language model using a neural processing unit according to an example of the present disclosure.

FIG. 2 illustrates a method of processing a language model using a neural processing unit according to an example of the present disclosure.

Referring to FIG. 2, the NPU 100 may obtain an attention output for input data in a step S11. Here, the input data may include a plurality of tokens (or a plurality of patches), and each token may be expressed as an embedding vector of a predetermined dimension ($d_{model}$). The number of dimensions ($d_{model}$) of the embedding vector may be, for example, 128, 256, 1024, 2048, or 4096. Hereinafter, for convenience of description, it is assumed that the number of dimensions ($d_{model}$) of the embedding vector is 4096 in this embodiment. Accordingly, under the computing system 1000, one token may be expressed as a 1×4096-dimensional embedding vector.

For example, if a user inputs to the computing system 1000 "npu is an AI accelerator" consisting of five tokens, the computing system 1000 may convert the corresponding input text into an embedding matrix of a size of 5×4096 (i.e., five×1×4096), and the NPU 100 may receive the corresponding embedding matrix.

The NPU 100 may obtain a query vector Q by matrix-multiplying a query weight matrix to an embedding vector of a current token. The NPU 100 may obtain a key matrix K by matrix-multiplying a key weight matrix to the embedding matrix.

Then, the NPU 100 may obtain similarity through matrix multiplication between the query vector Q of the current token and the key matrix $K^T$ of the entire sequence. As a result, an attention score vector $QK^T$ having the same size (1×5) as the number of tokens of the input data is obtained. $QK^T$ represents similarity with keys (each of five tokens) for the current token.

However, since elements of the obtained vector $QK^T$ may be numerically very large, a normalized final similarity may be obtained by dividing $QK^T$ by the square root of the dimension of the key vector (√(dk)) for numerical stability and then applying a softmax operation. Equation 1 below defines a formula for calculating a softmax-based similarity value ($q_k$) for the current token and a key k. The similarity value ($q_k$) is also referred to as an attention weight. In Equation 1, k may be one of 1, 2, . . . , N, where N is the number of tokens included in the input data, i.e., a natural number of two or more. In this embodiment, N=5.

$$q_k = \text{softmax}\left(\frac{QK^T}{\sqrt{d_k}}\right) \quad \text{Equation 1}$$

Here, the softmax operation is an operation that converts multiple numbers into probabilities between 0 and 1. Equation 2 below represents a formula for performing a softmax operation value on a vector $[z_1, z_2, \ldots, z_n]$.

$$\sigma(z_i) = \left(\frac{e^{z_i}}{\sum_{j=1}^{n} e^{z_i}}\right) \quad \text{Equation 2}$$

However, if a value that is too large exists in $z_i$, a numerical instability problem may occur. To solve this, a method of subtracting a maximum value, $z_{max}$ (negative exponential trick), may be used to enable mathematically more stable calculation. Equation 3 below is a softmax operation formula modified using $z_{max}$ calculated in Equation 2.

$$\sigma(z_i) = \left(\frac{e^{z_i - z_{max}}}{\sum_{j=1}^{n} e^{z_i - z_{max}}}\right) \quad \text{Equation 3}$$

Through Equation 1, the similarity may be obtained as a vector of a 1×5 size of, for example, [0.007, 0.993, 0, 0, 0]. The similarity is a value in which similarity with other tokens for the current query (e.g., 'npu') is expressed as a probability.

According to an embodiment, the NPU 100 may assign a value to the attention weight. The value matrix may be converted into a value matrix through matrix multiplication of the embedding matrix with a pre-learned value weight matrix, similar to the method of calculating the key matrix. An attention output vector may be obtained by matrix multiplying the attention weight vector obtained through Equation 1 by the value matrix V. Accordingly, an attention output vector of a 5×4096 size, which is the same dimension as the input data, may be consequently obtained by performing an operation such as Equation 4.

$$\text{Attention Output} = \text{softmax}\left(\frac{QK^T}{\sqrt{d_k}}\right) \times V \quad \text{Equation 4}$$

That is, the NPU 100 may repeatedly perform the operation of Equation 4 to generate output data. In this process, it can be seen that the NPU 100 repeatedly performs high-dimensional calculations including operations such as matrix multiplication operations, division, and multiplication. According to an embodiment, the NPU 100 may additionally perform residual connection and layer normalization. Residual connection and layer normalization are to compensate for the possibility of gradient vanishing that may occur in a differentiation-based learning method of deep learning, and information loss can be minimized by summing an input value to an output value that has passed through a layer of an artificial neural network. For residual connection, an embedding vector of input data may be added to the attention output vector after the attention output vector is calculated. Layer normalization may mitigate covariant shift by adjusting values based on a mean and variance of an output value (i.e., a result of residual connection) in natural language processing.

After the step S11, the NPU 100 may process the attention output vector through a feed-forward neural network in a step S12. Here, the feed-forward neural network is for predicting a non-linear phenomenon, and allows contextual meaning such as phrases or clauses to be inferred by recombining relationship information of tokens for which the attention output vector is calculated. The feed-forward neural network may use, for example, a fully connected hidden layer having 2,048 nodes and two layers, and an output may be a vector of 4,096 dimensions, which is the same as the input. The feed-forward neural network may be trained in advance, and a matrix multiplication operation may be repeatedly performed for inference. Input data input to the feed-forward neural network is expressed as a 4,096-dimensional vector as a result value that has undergone residual connection and normalization in the step S11, and residual connection and normalization of the step S11 may be additionally performed on output data of a hidden layer composed of two layers.

After the step S12, the NPU 100 may generate a final output token in a step S13.

In order to generate the final output token, the output vector, which is the output data calculated in the step S12, needs to be expanded to the number of the entire token set (e.g., 30,000) that can be processed in the language model. For example, the output vector of step S12 may be matrix multiplied with a final output weight matrix (e.g., 4,096×30,000) and expanded to a logit vector of a size of 1×30000. The size of the final output weight matrix for the final output is $d_{model}$×SIZE_DIC, where SIZE_DIC represents the number of total tokens outputtable from the language model currently under inference operation in the NPU (30,000 in this embodiment). A softmax operation is applied to the calculated logit vector of 1×30,000 size so that all 30,000 tokens are normalized to probability values between 0 and 1, and a token having the highest probability value among the 30,000 probability values may be selected as an output token to be generated next. For example, if input data to the NPU 100 is 'npu is an AI accelerator', the output token may be determined as 'yes', and if the input data is 'npu is an AI accelerator yes you are an', the output token may be determined as 'expert'.

As described above with reference to FIGS. 1 and 2, the NPU 100 repeatedly performs numerous matrix multiplication operations (MatMul, e.g., matrix multiplication between an activation value matrix and a weight matrix), vector operations, scalar operations, and the like for an inference operation of a transformer-based artificial neural network model, and the NPU 100 needs to be optimized for these operations. Hereinafter, the structure and operation of the NPU 100 will be described.

Figure 3:
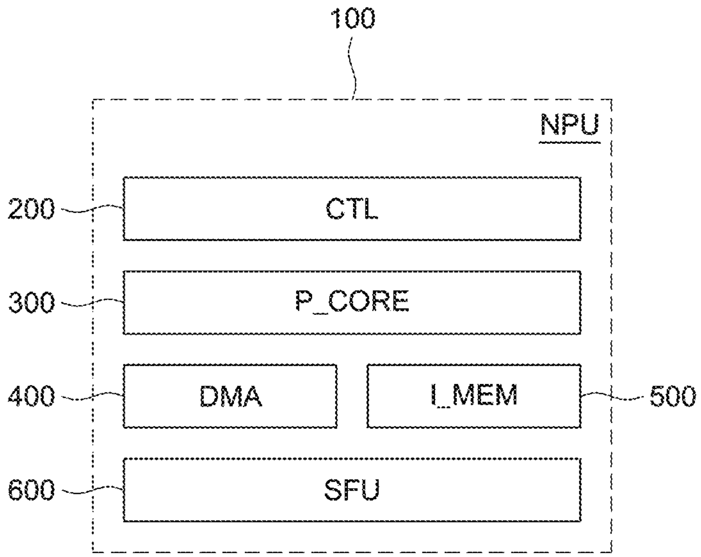
FIG. 3 is a block diagram illustrating a neural processing unit according to examples of the present disclosure.

FIG. 3 illustrates a neural processing unit according to examples of the present disclosure.

Hereinafter, the neural processing unit 100 will be described in detail with reference to FIG. 3. The neural processing unit 100 is a dedicated processor specialized for deep neural network (DNN) operations separately from a processor such as a central processing unit or a graphics processing unit. The neural processing unit 100 may be referred to as a tensor processing unit (TPU), an AI accelerator, a neural signal processor (NSP), a neural network processor (NNP), and the like.

The neural processing unit 100 may be a semiconductor implemented as an electric/electronic circuit. That is, respective components of the neural processing unit 100 may be semiconductor circuits composed of numerous electronic elements (e.g., transistors, capacitors, electrical wiring, etc.). Therefore, some of these may be difficult to identify and distinguish with the naked eye, and may be identified only by operation.

This neural processing unit 100 is for accelerating an artificial neural network operation and is also called an artificial intelligence hardware accelerator. The artificial neural network may output an operation of a transformer-based language model. However, it is not limited thereto and may also process vision-based models such as YOLO or ResNet. It may be mounted on a device to output various information based on artificial intelligence. The device may further include a central processing unit, a graphics processing unit, an application processor (AP), a microcontroller unit (MCU), and the like in addition to the neural processing unit 100. The device may include a microphone, a camera, a touch pad, a keyboard, and the like to receive input data, and may include a monitor, a speaker, and the like to output output data. The device may include, but is not limited to, a smartphone, an assistant terminal located in a home or office, a home appliance, a VCU or ADAS system of a vehicle, a camera such as a CCTV, a robot, smart mobility, and the like.

The neural processing unit 100 according to examples of the present disclosure is specifically designed to accelerate an attention algorithm of a transformer-based neural network model with low power, which will be described in detail later. However, the neural processing unit 100 of the present disclosure is not limited to a transformer neural network, and may process various neural network models such as a convolutional neural network (CNN).

The neural processing unit 100 that can be applied to examples of the present disclosure may include a controller (CTL) 200, a processing core (P_CORE) 300, a direct memory access unit (DMA) 400, an internal memory (I_MEM) 500, and a special function unit (SFU) 600.

The processing core 300 and the special function unit 600 of the neural processing unit 100 may be operation circuits configured to efficiently process an attention layer of a neural network model. The attention layer may obtain an attention score (Q, K, V), which is an operation value, using an input value and parameters such as a query (Q), a key (K), and a value (V).

The processing core 300 and the special function unit 600 are designed to process operations such as matrix multiplication, root mean square normalization, and softmax for an attention operation. A tensor data form required for the operations may be one of a multidimensional matrix form, a 2D matrix form, a 1D array form, or a scalar value, and one of the processing core 300 and the special function unit 600 may be selected for an operation according to the data form. Therefore, the neural processing unit 100 can rapidly accelerate operations of a generative artificial intelligence model with low power by appropriately adopting appropriate hardware modules according to operations.

That is, the processing core 300 is capable of processing mathematical operations required for an artificial neural network inference operation, and may include an arithmetic logic unit (ALU), a multiply-accumulate unit (MAC), an adder tree, and the like.

The controller 200 may be electrically connected to the processing core 300, the direct memory access unit 400, the internal memory 500, and the special function unit 600. The controller 200 may be configured to control operations related to a neural network operation of the neural processing unit 100. The controller 200 may control respective circuits included in the neural processing unit 100 to process an inference operation of a neural network model by an executable code generated by a compiler (not shown). Here, the compiler may be a semiconductor circuit, or may be a software module operating in a device separate from the neural processing unit 100.

The compiler may obtain an executable code executable in the neural processing unit 100 by compiling a specific neural network model. That is, the compiler may generate an executable code that can be exclusively executed in a specific neural processing unit having specific performance. The executable code may also be referred to as machine code or binary code.

The controller 200 may control the processing core 300, the direct memory access unit 400, the internal memory 500, and the special function unit 600 based on various commands and an operation schedule included in the executable code. For example, in the present disclosure, the controller 200 may be operatively connected to each of the processing core and the special function unit.

The compiler may be provided with hardware characteristics of the neural processing unit 100. Such hardware characteristics may include operation performance of the processing core 300, operation performance of the special function unit 600, capacity of the internal memory 500, and bandwidth of a main memory (not shown) of a corresponding bus (not shown), and the like. In addition, the compiler may be provided with structure information of a neural network model to be processed by the neural processing unit 100, information of algorithms included in the neural network model, and size information of parameters. Then, the compiler may generate an executable code for controlling a read/write order of data required for a neural network operation, a neural network operation processing order, whether each component of the neural processing unit 100 operates, and the like. The controller 200 may be provided with the executable code from the compiler and control the neural processing unit 100 based on the executable code. Each executable code may be generated corresponding to each neural network model, and the neural processing unit 100 may be configured to process at least one executable code.

The processing core 300 may include an electronic circuit specialized for matrix multiplication, which occupies the largest amount of operation among neural network operation amounts. As an example, the processing core 300 may be composed of a plurality of processing elements. For example, the processing core 300 may be designed with a processing element array structure of M×N (wherein M and N are integers) or an adder tree structure, but is not limited thereto. The processing core 300 may be configured to process a matrix multiplication operation of input data and corresponding parameters (e.g., weight, kernel, query (Q), key (K), value (V), etc.) in a manner of processing data in parallel based on a plurality of processing elements.

Processing elements (not shown) may each include a multiply-and-accumulate (MAC) operator. As an example, a processing element may include at least one multiplier and an accumulator. Therefore, the processing core 300 can efficiently process matrix multiplication or convolution operations. To explain further, the processing core 300 may be a circuit designed to simultaneously process tensor data of an M×N size. Here, the number of processing cores 300 is at least one. The processing core 300 may exchange data with a plurality of operation blocks of the special function unit 600, the internal memory 500, and the main memory (not shown). The processing core 300 may be configured to receive an integer parameter as input and output an integer parameter. The input integer parameter may include an input parameter and a weight. The input parameter may be configured to have a first bit-width, and the weight parameter may be configured to have a second bit-width. The output integer parameter may be configured to have a third bit-width, and the third bit-width may be configured to be larger than the first bit-width or the second bit-width.

As the number of processing elements (not shown) included in the processing core 300 increases, the number of transistors of an application specific integrated circuit (ASIC) increases, and manufacturing cost may increase. If the circuit of the processing core 300 is designed to process integer parameters rather than floating-point, the number of transistors of the ASIC can be significantly reduced, and power consumption of the neural processing unit 100 can be significantly reduced. According to an embodiment of the present disclosure, the floating-point format may be any one of Brain Floating-Point 16 (BF16), TensorFloat-32 (TF32), 8-bit Floating-Point (FP8), or Block Floating Point (BFP), but is not limited thereto.

The bit-width of an integer parameter that can be processed by the processing core 300 may be determined based on a hardware design of a processing element (not shown). This will be described later in FIG. 4. The number of processing elements (not shown) may be hundreds to tens of thousands. To explain further, the number of transistors included in a processing element designed to process a floating-point parameter is about four times larger than the number of transistors included in a processing element designed to process an integer parameter. Therefore, if the circuit of the processing core 300 of the neural processing unit 100 according to examples of the present disclosure is designed to exclude a floating-point parameter operation and operate only an integer parameter, the number of transistors can be reduced by about 75% compared to a floating-point operation circuit. In this embodiment, the number of processing elements included in the processing core 300 can be easily increased in the same chip area compared to floating-point, and there is an effect that operation processing performance can be improved with low power while reducing the size of a semiconductor chip.

The special function unit 600 may refer to a collection of various circuit units configured to process various neural network operations not processed in the processing core 300. That is, it is a circuit capable of accelerating special operations that are difficult to perform in an ALU. The special function unit 600 may perform exponential operations, log functions (log, ln), square roots (sqrt), reciprocal and reciprocal square roots (reciprocal, 1/sqrt (x)), trigonometric functions (Sin, Cos, Tan, ArcSin, ArcCos, etc.), quantization (INT8/FP16 conversion, etc.) operations, and the like. For example, the special function unit 600 may efficiently perform softmax function operations, RMS Norm, and quantization and dequantization operations, which are closely related to attention operations performed in a large language model (LLM).

For example, the special function unit 600 may convert floating-point (FP) data into integer (INT) data by performing a quantization operation and may also inversely convert integer data into floating-point data by performing a dequantization operation using a plurality of operation blocks. For example, floating-point data having a floating-point format of BF16, TF32, FP8, or BFP may be quantized into integer parameters that are supplied to the processing core 300.

The special function unit 600 includes a plurality of operation blocks, and according to an embodiment, the plurality of operation blocks may include a vector-dedicated operation block that exclusively performs a vector operation and a mixed operation block that performs both vector and scalar operations. However, the special function unit 600 is not limited to this embodiment, and each of the plurality of operation blocks may exclusively perform a vector operation or exclusively perform a scalar operation.

The vector-dedicated operation block of the special function unit 600 may refer to a set of circuits that process at least some of the remaining operations excluding matrix multiplication processed in the processing core 300 among operations of an artificial intelligence model.

Referring again to FIG. 3, the direct memory access unit 400 may access at least one memory electrically connected to the neural processing unit 100 to perform a read/write operation of data. The at least one memory may include at least one of a main memory (not shown), a shared memory (not shown), a storage device (not shown), and the like. The neural processing unit 100 may transmit various data related to an artificial intelligence operation to at least one memory (not shown) or read data from at least one memory (not shown) through the direct memory access unit 400. The direct memory access unit 400 may be configured to perform operations such as setting of an address of the internal memory 500, generating and controlling a read/write command, and the like. The direct memory access unit 400 may be connected to at least one communication bus and configured to control at least one memory.

The internal memory 500 is a memory disposed in an on-chip area of the neural processing unit 100. The internal memory 500 may include a memory for caching or storing data processed in the on-chip area and/or a register file for storing commands for driving a compiled neural network model. The register file may also be configured to be included in the controller 200. For example, when a memory (not shown) connected to a bus is provided, the internal memory 500 may read data required for an operation from the memory and store the data. The internal memory 500 may include SRAM, register file, DRAM, resistive RAM, magneto-resistive RAM, phase-change RAM, ferroelectric RAM, or flash memory, and the like. The internal memory 500 may be composed of at least one memory unit. The internal memory 500 may be composed of a homogeneous memory unit or a heterogeneous memory unit. The capacity of the internal memory 500 may be several megabytes to tens of megabytes, but is not limited thereto.

In addition, input and output of the processing core 300 may be in an integer form. Input and output for a plurality of operation blocks included in the special function unit may be in a floating-point form.

According to examples of the present disclosure, floating-point is not limited to IEEE standard 754, and brain floating-point, dynamic floating-point, variable precision floating-point (VPFP), custom floating-point (CFP), or flexible floating-point (FFP), etc. may be applied for operation efficiency, memory usage reduction, power consumption reduction, etc. of the neural processing unit 100. VPFP is a floating-point format capable of dynamically setting or adjusting a bit-width of an exponent and a mantissa. Using VPFP allows flexible precision levels based on specific calculations to optimize power and performance. Using a dynamic floating-point format, used interchangeably with variable precision, allows adjusting mantissa and exponent sizes on the fly during runtime to respond to data characteristics in real time. CFP refers to an application-specific format in which bit allocation for a mantissa and an exponent is adjusted to meet the needs of a specific use case. This can be useful for implementing the neural processing unit 100 that selects an exact bit-width to optimize hardware resources and data accuracy. FFP refers to a floating-point format that allows adjustable bit allocation between an exponent and a mantissa. FFP may be implemented in the neural processing unit 100 to provide an optimal balance between range and precision. The bit-width of floating-point according to examples of the present disclosure may be between 4 bits and 32 bits. According to examples of the present disclosure, the bit-width of an integer may be between 4 bits and 32 bits.

The neural processing unit 100 disclosed in the present disclosure may provide at least one of a power gating, clock gating, and register retention function that allows the neural processing unit 100 to operate with low power.

The power gating function is a technology that completely cuts off power to an unused circuit block to remove leakage power. A circuit block to which power gating is applied is provided with a power switch. Accordingly, a specific circuit block of the neural processing unit 100 can be separated from a power source using the power switch. The power gating function can remove both dynamic power and leakage power, allowing a device to operate in a low-power mode.

The clock gating function is a technology that reduces dynamic power consumption by blocking a clock signal of an unused circuit block. A circuit block to which clock gating is applied may selectively block a clock signal input to a specific circuit block using clock control logic. When clock gating is applied, since power is continuously supplied to the neural processing unit (NPU), the state of the circuit can be maintained. Since power is not turned off in clock gating, operation can be resumed immediately when the clock is reactivated, and dynamic power can be saved by reducing unnecessary switching activity.

The register retention function is a technology designed so that a specific register of the neural processing unit 100 can maintain a state even when power is turned off. A register to which register retention is applied can maintain data stored in the register using only low power in a sleep mode. Therefore, even if the register is switched to a power saving mode, an important register value is maintained, so initialization is not required upon return. Register retention can provide low-power operation, and can maintain data using extremely little power even when the power of the neural processing unit 100 is turned off.

Figure 4:
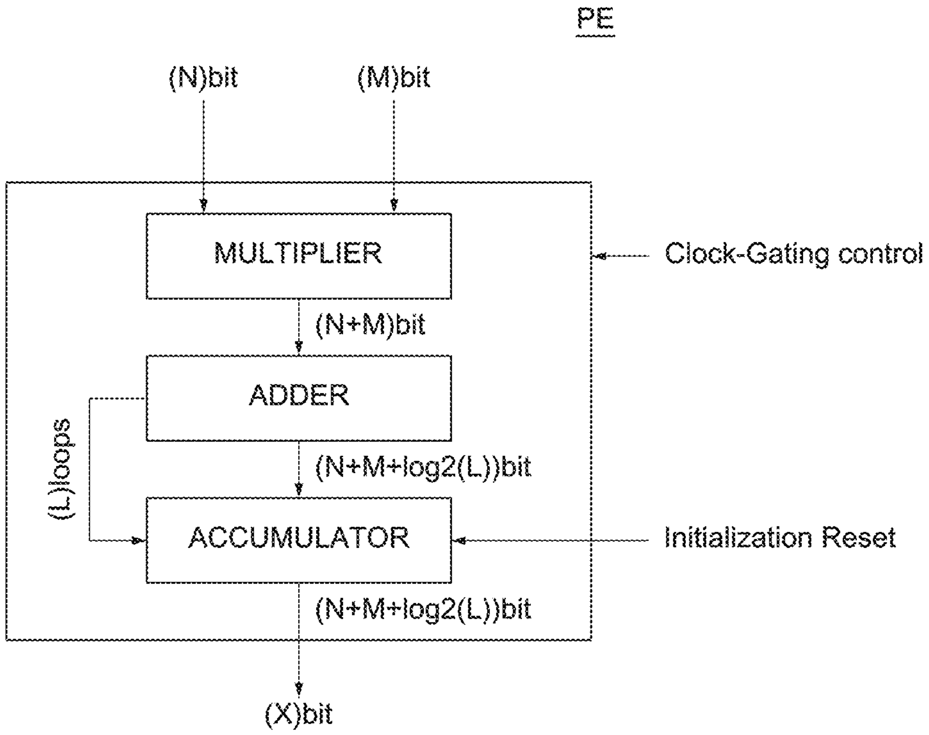
FIG. 4 is a block diagram illustrating a processing element according to examples of the present disclosure.

FIG. 4 illustrates a processing element according to examples of the present disclosure.

Referring to FIG. 4, the processing element PE may be configured to include a multiplier, an adder, and an accumulator. The processing element PE of FIG. 4 may be one of a plurality of processing elements (PE) included in the processing element core 300 of FIG. 3.

The multiplier multiplies received (N) bit data and (M) bit data. An operation value of the multiplier is output as (N+M) bit data. Here, N and M are integers greater than 0. A first input unit may be configured to receive (N) bit data. A second input unit may be configured to receive (M) bit data. As an example, the first input unit may be configured to receive an input parameter, and the second input unit may be configured to receive a weight value.

A bit-width of a parameter input to the first input unit and the second input unit of the processing element PE may be determined when compiling a current neural network model processed by the NPU 100 to obtain an executable code. That is, the bit-width of the input parameter and the bit-width of the weight value of the neural network model may be determined in a compilation step by a compiler. For example, the input parameter and the weight value may be quantized such that their respective bit-widths are the same. Here, the bit-width may be 32 bits, 16 bits, 8 bits, 4 bits, etc., but the present disclosure is not limited thereto. For example, the bit-width of the input parameter and the bit-width of the weight value may be determined to be different from each other, and parameters may be quantized based on the respective bit-widths. For example, the bit-width of the input parameter and the bit-width of the weight value may be quantized to 16 bits and 8 bits, respectively. For example, the bit-width of the input parameter and the bit-width of the weight value may be quantized to 8 bits and 4 bits, respectively. That is, bit-widths of parameters input to respective input units of the processing element PE may be different from each other. Quantization information of data input to respective input units of the processing element PE may be included in the executable code.

The accumulator accumulates the operation value of the multiplier and an operation value of the accumulator using the adder for the number of (L) loops. Therefore, a bit-width of data of an output unit and an input unit of the accumulator may be output as (N+M+log 2(L)) bits. Here, L is an integer greater than 0. When accumulation is terminated, an initialization signal (Initialization Reset) is input so that data stored inside the accumulator may be initialized to 0. The accumulator of the processing element PE is configured to maintain an accumulated value when zero-skipping is activated. Output data (X) bits may be set to a bit-width in which overflow of the output data (X) bits does not occur based on a maximum value that can be accumulated in the accumulator. For example, the (X) bits may be 16 bits to 64 bits.

To explain further, the SFU 600 may convert an integer parameter output from the processing element core 300 into a floating-point and transmit it to the internal memory 500. The SFU 600 may be controlled under a control signal of the controller 200.

When 0 is input to one of the first input unit and the second input unit of the multiplier, the controller 200 may limit an operation (e.g., a zero-skipping operation) so that the multiplier does not perform an operation based on the fact that an operation result becomes 0 even if the operation is not performed. For example, when 0 is input to one of the first input unit and the second input unit of the multiplier of the processing element PE, the multiplier may operate in a zero-skipping manner. For zero-skipping, each processing element PE included in the processing element core 300 may be activated or deactivated, respectively. The controller 200 may provide an activation or deactivation signal, i.e., the Clock-Gating Control of FIG. 4, to each processing element PE in clock units (per clock cycle). When the processing element PE is deactivated, the multiplier is deactivated. Accordingly, power consumed for the operation of the multiplier may be reduced. An example of power consumption of the multiplier may appear in FIG. 5.

The processing element PE may be designed to receive a clock-gating control signal for zero-skipping operation control (i.e., activation or deactivation) from the controller 200. Specifically, the multiplier of each processing element PE may be designed to receive the clock-gating control signal for zero-skipping operation control from the controller 200. Alternatively, the adder of the processing element PE may be modified and designed to receive a clock-gating control signal for zero-skipping operation control from the controller 200. Alternatively, each multiplier and adder of the processing element PE may be modified and designed to simultaneously receive respective clock-gating control signals for zero-skipping operation control from the controller 200.

Figure 5:
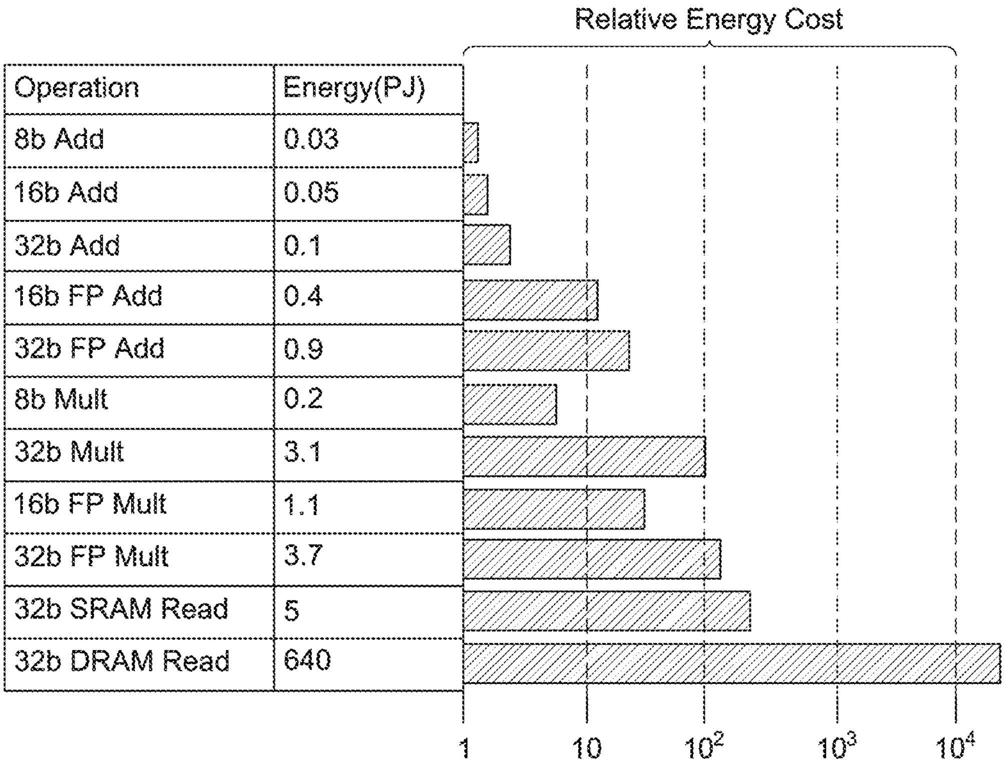
FIG. 5 is a table illustrating energy consumption per unit operation of a neural processing unit according to examples of the present disclosure.

FIG. 5 schematically illustrates energy consumption per unit operation of a neural processing unit according to examples of the present disclosure.

First of all, energy consumption may be described by classifying it into, for example, an addition operation and a multiplication operation. However, energy consumed per unit operation may vary depending on a foundry process technology (e.g., 2 nm technology, 5 nm technology, 7 nm technology, 14 nm technology, 28 nm technology, etc.) of a semiconductor chip or technological prowess of a specific foundry company.

Meanwhile, the processing element core 300 may be designed to calculate an integer parameter of a specific bit-width. Thus, with respect to FIG. 5, the label "8b INT Add" refers to an 8-bit integer addition operation of the adder of the processing element. The 8-bit integer addition operation may consume energy of 0.03 pJ. The label "16b INT Add" refers to a 16-bit integer addition operation of the adder of the processing element. The 16-bit integer addition operation may consume energy of 0.05 pJ. The label "32b INT Add" refers to a 32-bit integer addition operation of the adder of the processing element. The 32-bit integer addition operation may consume energy of 0.1 pJ. The label "8b INT Mult" refers to an 8-bit integer multiplication operation of the multiplier of the processing element. The 8-bit integer multiplication operation may consume energy of 0.2 pJ. The label "32b INT Mult" refers to a 32-bit integer multiplication operation of the multiplier of the processing element. The 32-bit integer multiplication operation may consume energy of 3.1 pJ.

To explain further, when the processing core 300 is composed of thousands to tens of thousands of processing elements PEs designed as integer operators, power consumption of the NPU 100 can be significantly reduced compared to a case where the processing core is composed of the same number of processing elements designed as floating-point operators. Generally, in the case of a generative artificial intelligence model, since most operations are processed in the processing element core 300, designing an operator of a specific integer bit-width is important for low-power design of the NPU 100.

The SFU 600 may be designed to calculate a floating-point parameter. The label "16b FP Add" refers to a 16-bit floating-point addition operation of the adder of the SFU 600. The 16-bit floating-point addition operation may consume energy of 0.4 pJ. The label "32b FP Add" refers to a 32-bit floating-point addition operation of the adder of the SFU 600. The 32-bit floating-point addition operation may consume energy of 0.9 pJ. The label "16b FP Mult" refers to a 16-bit floating-point multiplication operation of the multiplier of the SFU 600. The 16-bit floating-point multiplication operation may consume energy of 1.1 pJ. The label "32b FP Mult" refers to a 32-bit floating-point multiplication operation of the multiplier of the SFU 600. The 32-bit floating-point multiplication operation may consume energy of 3.7 pJ. To explain further, if the SFU 600 is designed as floating-point operators, it is advantageous in terms of power consumption of the NPU 100 and miniaturization of semiconductor chip size to design the number of operators of the SFU 600 to be relatively smaller than the number of processing elements of the processing element core 300. Therefore, the number of floating-point operators of the SFU 600 may be designed to be smaller than the number of integer operators of the processing element core 300. In other words, the SFU 600 is configured to process all types of operations by executing a combination composed of one or more minimized operation blocks based on a command set for a vector-dedicated operation block 51 and/or a mixed operation block 52, rather than separately providing operation blocks matching operations for various types of operations such as softmax, quantization, dequantization, and normalization (e.g., RMS-Normalization). Accordingly, since overlapping operation blocks can be eliminated or minimized, the SFU 600 can be miniaturized.

According to an embodiment, operation efficiency of the NPU 100 may be improved by implementing data pipeline circuit designs of the processing element core 300 and the SFU 600 such that array sizes of specific dimensions of tensor data processed by the NPU 100 are compatible with each other among hardware components.

A system-on-chip (SoC) including the neural processing unit of the present disclosure may be implemented in various forms according to application fields and performance requirements.

In one embodiment, the system-on-chip is capable of various modifications in terms of memory configuration.

For example, it may be a simple structure using only an external memory, or a plurality of external memories may be configured in parallel to secure bandwidth. In addition, by arranging a separate shared memory inside the chip to reduce power consumption and storing parameters with a high reuse rate, energy consumption for memory access can be significantly reduced. Such an internal memory may be implemented as a single configuration or a plurality of independent modules, and an optimized storage method for each of various domains such as weight data or input/output data may be applied.

In one embodiment, a processing unit configuration may also be variously expanded.

For example, only a single neural processing unit may be included, or a plurality of processing units may be arranged in parallel to improve throughput. In addition, when a specific operation is inefficiently processed in the neural processing unit, a separate digital signal processing unit for assisting this may be added to improve overall system performance. The plurality of processing units may operate independently or may be implemented in a manner of distributed processing of a large-scale neural network model by cooperating.

In one embodiment, a bus architecture for data transmission may also have various forms.

For example, a dedicated bus responsible for high-speed data transmission between a memory and the neural processing unit may be configured, and a separate bus for control signal exchange with a central processing unit may be included. When a shared memory is included therein, an additional communication path for data exchange between the corresponding memory and the neural processing unit may be provided. The bandwidth and structure of each bus may be appropriately adjusted according to target processing performance and the scale of a neural network model.

In one embodiment, the system-on-chip may be implemented to support various low-power modes.

For example, various power management functions such as a sleep mode, a deep sleep mode, and a retention mode may be provided, and power saving techniques in units of circuits such as clock gating or power gating may be selectively applied. This configuration is advantageous in a battery-based environment such as a mobile device or an edge device.

In one embodiment, a physical implementation method of the system-on-chip is also diverse.

For example, a package including a chip and a memory may be efficiently arranged within a limited space, and if necessary, package size and performance may be optimized by rotating chip arrangement or configuring it in multiple layers. In addition, various technologies such as a fan-in structure, a fan-out structure, a stacked package, or an interposer-based package may be applied as a packaging method.

In one embodiment, the system-on-chip is capable of optimization in terms of a manufacturing process as well.

For example, the operation unit may be implemented using a high-performance fine process, and the memory unit may be applied with a relatively relaxed process to balance manufacturing cost and chip size.

As such, the system-on-chip of the present disclosure may be flexibly configured according to requirements of application fields in various aspects such as memory configuration, number of processing units, data transmission structure, power management function, packaging method, etc., and may be applied to a wide range of environments from low-power on-device artificial intelligence systems to accelerators for high-performance data centers.

Figure 6:
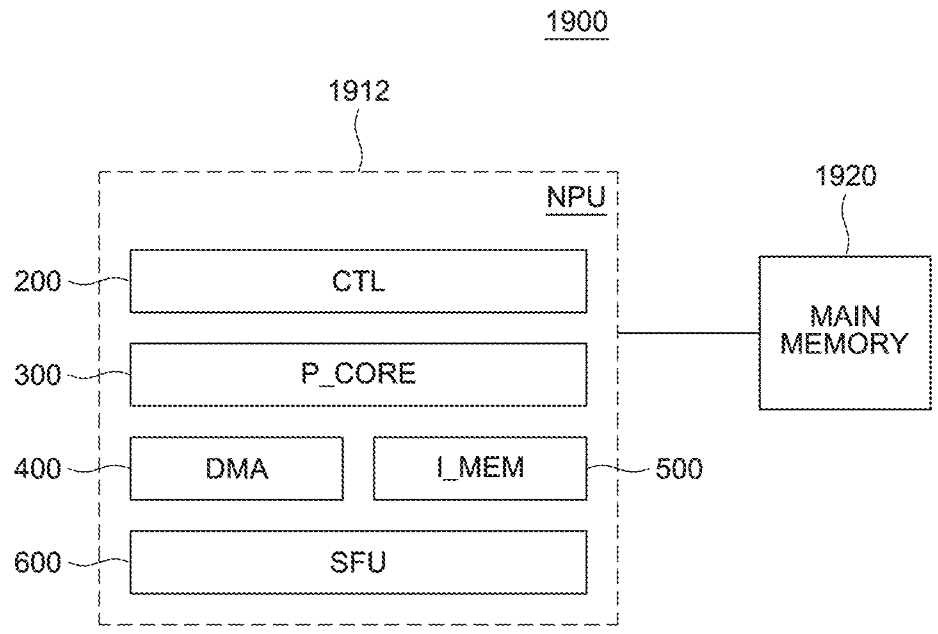
FIG. 6 illustrates an electronic device for processing a language model in an on-device manner according to an embodiment.

FIG. 6 illustrates an electronic device for processing a language model in an on-device manner according to an embodiment.

The electronic device 1900 may include various devices such as a mobile device including a smartphone and a smartwatch, a home appliance, a drone, a camera, a robot, a vehicle, a laptop, a computer, an Internet of Things device, an AI assistant, and smart mobility, but is not limited thereto. A user may input a voice signal or text data to the electronic device 1900, and the electronic device 1900 may perform an inference operation using a large language model to generate a response (or answer). This operation has been described above with reference to FIGS. 1 and 2. The electronic device 1900 may perform inference in an on-device manner that does not perform communication with the outside at all in order to generate a response to text input by the user using the large language model.

The electronic device 1900 may include an NPU 1912 and a main memory 1920. According to an embodiment, the electronic device 1900 may further include a CPU or a GPU. Since the neural processing unit 1912 of FIG. 7 corresponds to the neural processing unit 100 described above with reference to FIGS. 3 to 6, overlapping descriptions regarding the neural processing unit 1912 of FIG. 6 may be omitted.

Data required for execution of a compiled large language model (LLM) may be stored in the main memory 1920. In this memory, an artificial neural network for an inference operation of the LLM may be compiled and stored, and a compilation process may be performed by the CPU of the electronic device 1900, but is not limited thereto.

Weight values (weight values of an artificial neural network) including a query, key, and value weight matrix for performing an inference operation based on an attention mechanism may be stored in the main memory 1920. Data stored in the main memory 1920 may include a query weight matrix, a key weight matrix, a value weight matrix, a feed-forward network (FFN) weight, a layer normalization parameter, and the like. A large language model may occupy a large capacity ranging from hundreds of MB to tens of GB depending on the type. For example, Meta's LLAMA 7B model is known to include parameters of about 13 GB, and OpenAI's GPT-3.5 based ChatGPT is known to include parameters of tens of GB or more.

The main memory 1920 may be representatively DRAM, but is not limited thereto and may be SRAM, HBM, or other non-volatile memories. However, for on-device type large language model inference, it is preferable that the electronic device 1900 is a mobile electronic device 1900 that a person can easily hold and move, and accordingly, LPDDR5 may be adopted as the main memory 1920.

As a representative embodiment, the main memory 1920 may be 8 GB of low power double data rate 5 (LPDDR5). LPDDR5 has characteristics of high-speed data transmission and low power consumption, and may be adopted as a main memory for storing parameters of a large language model in mobile and embedded systems. 8 GB is a minimum memory capacity capable of effectively mounting an LLM having billions to tens of billions of parameters on a mobile device and securing practical language understanding and generation functions when applying a data compression and quantization technique (e.g., 4-bit or 8-bit quantization) according to an embodiment of the present disclosure.

On the other hand, when using a memory less than 8 GB, the scale of a mountable model is limited, so the inference speed of the language model may significantly deteriorate. Conversely, if a memory exceeding 8 GB is applied, a larger scale model can be operated, but problems such as power consumption, heat generation, chip area increase, and manufacturing cost increase may occur in a mobile environment.

LPDDR5 memory of 8 GB can sufficiently store weight parameters of a quantized language model and provide bandwidth and capacity to efficiently process temporary data (activation value, cache, etc.) required for real-time inference. The high-speed data transmission capability of LPDDR5 is essential for quickly loading vast weights of an LLM and processing operation results. LPDDR5 provides superior power efficiency compared to existing DRAM, and a capacity of 8 GB allows performing sufficient functions while reducing power waste due to an unnecessarily large memory. Since idle power consumption increases as memory capacity increases, using a minimum necessary capacity is important in terms of battery life of an on-device device. In addition, a memory of 8 GB or less is a level that can be integrated without major restrictions into existing form factors and internal space designs of mobile devices such as smartphones and tablets. This is advantageous for adding LLM functions to existing mobile platforms without new hardware redesign.

In the main memory 1920, weight values of a large language model may be quantized and prepared in advance. Quantization may be performed in a compilation step of the large language model. According to a representative embodiment, the CPU may quantize a weight of a 32-bit or 16-bit floating-point form into an 8-bit integer form. In this embodiment, weights of at least one artificial neural network constituting the large language model (LLM) are quantized and stored in the main memory 1920, thereby achieving memory efficiency. For example, the form of weights of LLaMA is known as a 16 or 32-bit floating-point form. By quantizing a 32-bit weight value into an 8-bit integer, a memory capacity for loading a large language model can be reduced to one fourth (¼).

Weights stored in the main memory 1920 are values quantized based on an 8-bit integer as described above, and in order to perform inference of a large language model in real time in an on-device environment, a dedicated operation structure capable of reading and processing such integer-based large amounts of weight data at high speed is required. In particular, since operation resources and memory bandwidth are limited in mobile and embedded environments, a matrix multiplication operation engine for efficiently processing integer-quantized weights is essential.

Accordingly, in one embodiment of the present disclosure, a matrix multiply engine (MME) performing a matrix multiplication operation is included inside the NPU 1912, and the MME is configured to perform an inference operation of a large language model based on quantized weights with low power and high efficiency. An internal structure and operation procedure of the system-on-chip and the MME will be described in detail with reference to FIGS. 7 and 8 described later. In the content described later, it will be described that the processing core performs the role of the MME.

Figure 7:
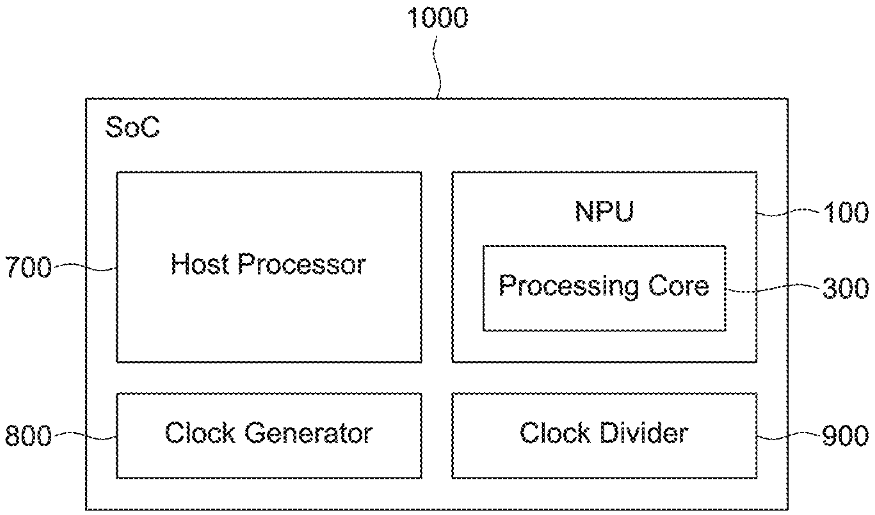
FIG. 7 is a block diagram showing a structure of a system-on-chip according to an embodiment of the present disclosure.

FIG. 7 shows a structure of a system-on-chip according to an embodiment of the present disclosure.

Referring to FIG. 7, the system-on-chip 1000 may include a host processor 700, a neural processing unit (NPU) 100, a clock generator 800, and a clock divider 900.

The host processor 700 may include a CPU and/or a GPU and/or a DSP, and performs an upper control function for the NPU 100. The host processor 700 may include a CPU as a representative embodiment. For example, the host processor 700 may provide an execution command for driving the NPU 100, and perform operation scheduling, data transmission request, interrupt processing, and the like. In addition, the host processor 700 performs various general-purpose operations such as operating system driving, communication processing, user interface processing, and sensor data processing separately from the neural processing unit 100, thereby minimizing an operation burden of the NPU 100 so that it can be effectively allocated to deep neural network operations.

The NPU 100 includes at least one processing core 300, and may function as a hardware engine for accelerating computation of a neural network model. The neural processing unit 100 may include not only the processing core 300 but also the controller 200, the direct memory access unit 400, the internal memory 500, and the special function unit (SFU) 600 of FIG. 3. Since detailed description of the configuration and operation method of the neural processing unit 100 has been described above with reference to FIG. 3, the structure and operation of the processing core 300 will be described below.

The processing core 300 may include a plurality of processing element pairs. Each of the processing element pairs may operate with two processing elements forming one pair. Such a processing element pair (PE pair) may be configured to perform operations on mutually different weight data in a synchronized manner in parallel while sharing the same activation value. That is, operation efficiency can be improved by performing processing on individual weight data in parallel while sharing operations based on the same input data.

The clock generator 800 generates a master clock (or master clock signal) for operation of the system-on-chip 1000, and the generated master clock is supplied to the clock divider 900. The master clock is used as a reference signal for each block inside the system-on-chip to operate in synchronization, and the clock generator 800 may generate a clock signal of a stable and accurate frequency from an external reference clock through a clock synthesis circuit such as a phase-locked loop (PLL). According to an embodiment, the clock generator 800 generates a master clock of 1.2 GHZ, and the generated master clock is supplied to the clock divider 900.

The clock divider 900 divides the master clock supplied from the clock generator 800 and performs a role of providing an appropriate clock frequency to each block inside the system-on-chip.

In one embodiment, the clock divider 900 may divide the frequency of the master clock by an integer ratio (e.g., ½, ¼, etc.) in consideration of performance requirements and power efficiency of each block.

The clock divider 900 of the present disclosure may provide a half clock (or half clock signal) obtained by lowering the frequency of the master clock by half to the neural processing unit 100 in order to reduce power consumption of the neural processing unit 100. The half clock is a signal having a frequency of one half the frequency of the master clock signal. Accordingly, the processing element pair inside the neural processing unit 100 operates based on the half clock, but two processing elements operate in parallel in synchronization, thereby securing power efficiency without a decrease in operation speed.

In one embodiment, when the frequency of the master clock is 1.2 GHZ, a half clock (e.g., 600 MHz) is generated by the clock divider 900, and the half clock may be supplied to the neural processing unit 100. In this case, the half clock is supplied to the processing core 300 area, and the master clock may be supplied to other areas excluding the processing core 300.

Figure 8:
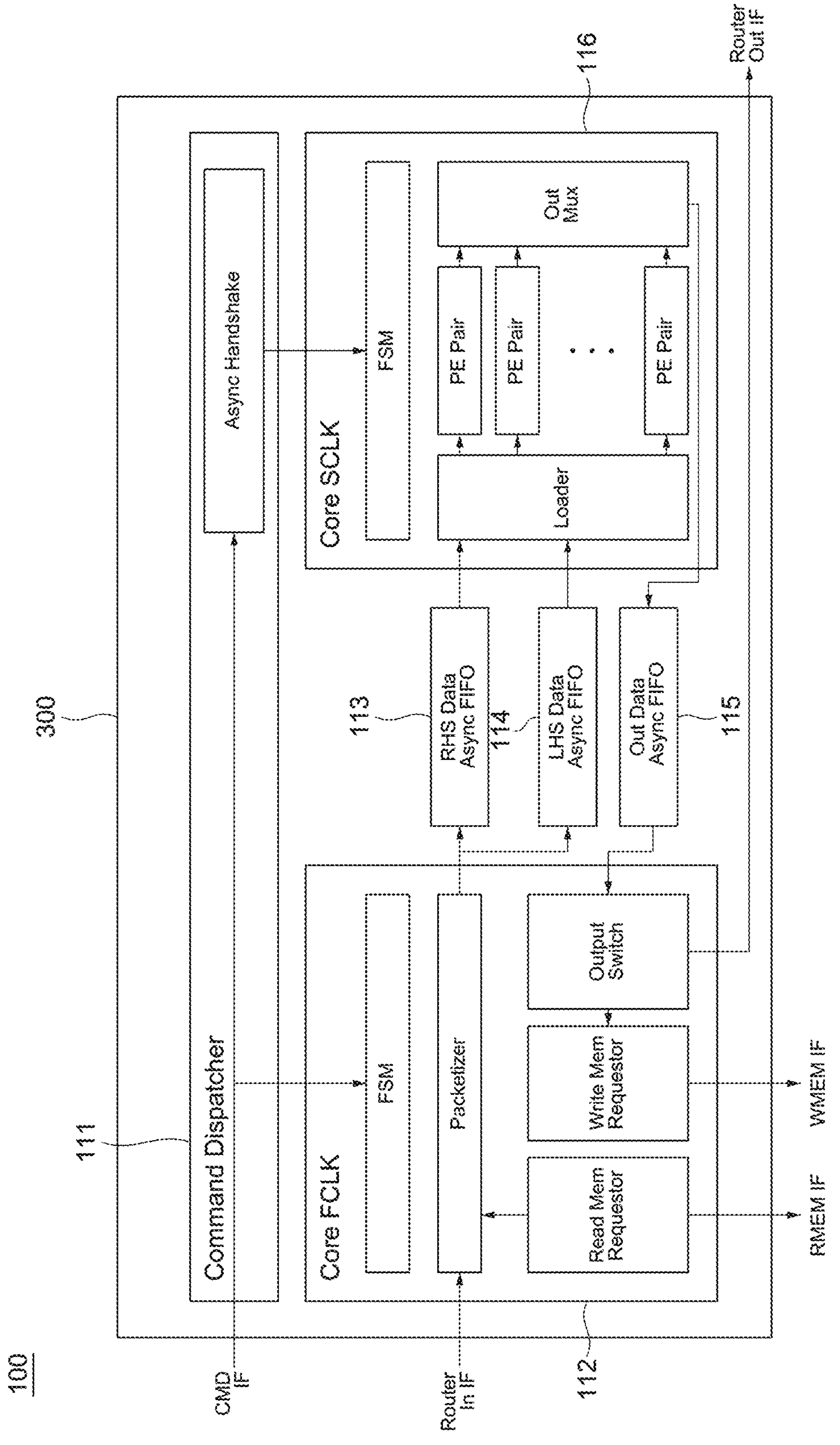
FIG. 8 is a block diagram illustrating a structure of a processing core according to an embodiment of the present disclosure.

FIG. 8 illustrates a structure of a processing core according to an embodiment of the present disclosure.

Referring to FIG. 8, the NPU 100 may include a processing core (P_CORE) 300. The processing core 300 according to the present disclosure may be replaced with a term such as MME and used.

The processing core 300 may include a command dispatcher 111 that receives an external command and controls internal operations, a region of a core FCLK 112 that performs preprocessing and packetization of data, asynchronous FIFOs 113, 114, and 115, and a region of a core SCLK 116 that performs matrix multiplication operations.

The core FCLK 112 operates in a relatively high clock domain, and performs a role of receiving and preprocessing data and commands input from the outside and transferring them to the SCLK region. The core FCLK 112 may include a finite state machine (FSM) for command control, a packetizer for data packetization, a read/write memory requestor for external memory access, and an output switch controlling a data transfer path to the SCLK region.

A CMD interface (CMD IF) is an interface for receiving control information related to a matrix multiplication operation command from an upper processor (e.g., CPU) or an internal scheduler. A router-in interface (Router In IF) is a path for receiving an input data stream from an upper network on chip (NoC) or a router, and may receive first input data, second input data, or other data for operation control. As a representative embodiment, the first input data may include an activation value, and the second input data may include weight data.

The FSM controls an operation order of each component in the core FCLK region based on command/status information received through the CMD interface and the router-in interface, and coordinates data flow between the packetizer, memory requestors, and output switch.

The packetizer performs a function of reconstructing data read from the router-in interface or an external memory to be suitable for an operation unit (e.g., MatMul tile unit). For example, the packetizer may divide a continuous data stream of the first input data or the second input data into packets or tiles of a certain size, and align/structure them in a format directly processable in the SCLK domain and store them in an internal buffer.

The read memory requestor generates a control signal for reading input data from an external memory through an read memory interface RMEM IF. The RMEM interface may include data/address/control signal paths for accessing external memories such as DRAM, LPDDR, and SRAM.

The write memory requestor generates a control signal for recording an operation result or an intermediate result in an external memory through a write memory interface WMEM IF, and the WMEM interface includes a data bus and a write control signal for storage.

The output switch performs a role of selectively transferring a packet generated in the packetizer to an appropriate FIFO among asynchronous FIFOs of FIG. 8 (i.e., the RHS data async FIFO 113, LHS data async FIFO 114, or output data async FIFO 115) according to a purpose.

Meanwhile, the asynchronous FIFOs 113, 114, and 115 are asynchronous buffers that stably guarantee data transfer between different clock domains (FCLK domain and SCLK domain). An asynchronous FIFO refers to a structure designed to transfer data without data loss even in a state where a clock at which a write operation is performed and a clock at which a read operation is performed are not synchronized with each other, that is, in a state having different periods and phases. Such an asynchronous FIFO drives a write pointer and a read pointer with independent clocks, respectively, and guarantees integrity of data transfer between domains using a pointer synchronization circuit and a dual port memory.

The RHS data async FIFO 113 is used to transfer second input data corresponding to a right-hand-side (RHS) operand or weight operand to the SCLK region 116. The LHS data async FIFO 114 is used to transfer first input data corresponding to a left-hand-side (LHS) operand or activation operand, and the output data async FIFO 115 is used to transfer result data of a matrix multiplication operation processed in the SCLK region 116 back to the FCLK region 112 or an upper router interface.

According to such a configuration, the core FCLK 112 can read the first input data and the second input data input from the external memory or the router-in interface, packetize them suitably for an operation unit, and stably transfer them to the SCLK region 116 using the asynchronous FIFOs.

The SCLK region 116 operates at a lower clock frequency than the FCLK region to secure power efficiency, and is a core processing section where actual matrix multiplication operations are performed.

The SCLK region 116 may include a loader, one or more PE pairs, and a selector (Out Mux) for outputting operation results.

The loader receives an input packet transferred from the FCLK region 112, through an asynchronous FIFO, and distributes data to each PE at an appropriate time point according to a processable state of the SCLK region, thereby performing a role of mitigating processing delay that may occur internally.

Each PE pair may be formed by a pair of two processing elements to perform a parallel operation.

According to an embodiment, a processing element pair (PE pair) performs a MAC operation on different second input data in a synchronized parallel manner while two processing elements are configured to share the same first input data. By sharing the same first input data, repetitive data loading is reduced, and accordingly, the amount of required data movement is reduced, so power efficiency can be improved.

The first input data may be an activation value, and the second input data may include weight data. The second input data may be a query weight, a key weight, a value weight, or a weight of a feed-forward neural network.

In addition, the second input data may be shared between a plurality of processing element pairs. Through this structure, the necessity to repeatedly load identical data from a memory is reduced, so power efficiency can be improved.

An operation result is stored in an accumulator inside the SCLK region 116, and a multiplexer (Out Mux) selects a value required by an instruction among accumulated results and converts it into output data. Thereafter, the selected output data is transferred back to the FCLK region 112 or the upper router interface through the output data async FIFO 115.

That is, the processing core 300 is configured to effectively perform inference of a large language model in an on-device environment through efficient parallel MAC execution based on input data reuse while operating at a low clock. Hereinafter, the operation of the processing element pair will be described.

Figure 9:
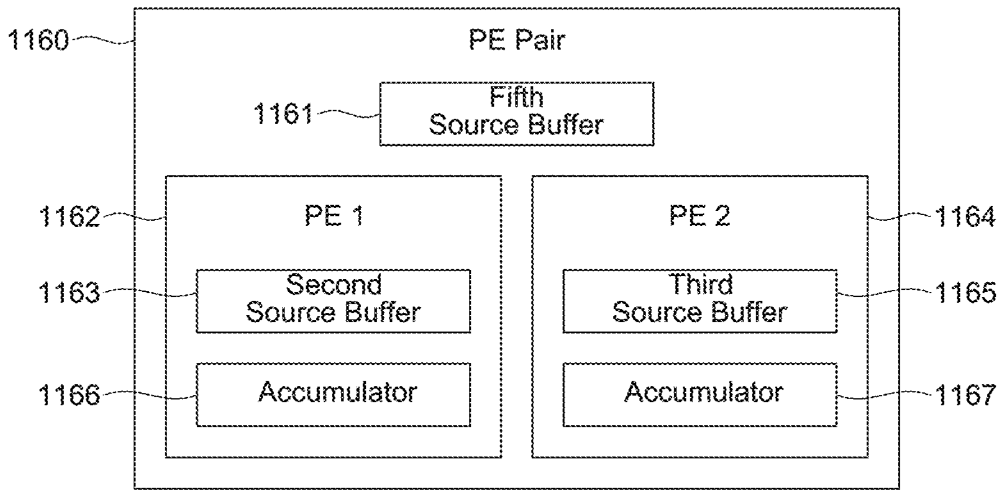
FIG. 9 is a diagram showing data sharing inside a processing pair according to an embodiment of the present disclosure.

FIG. 9 shows data sharing inside a processing pair according to an embodiment of the present disclosure.

Referring to FIG. 9, the processing element pair (PE pair) 1160 includes a first processing element 1162 and a second processing element 1164, and the two processing elements are configured to share a first source buffer 1161.

The first source buffer 1161 is a buffer for storing first input data, and is configured such that the first processing element 1162 and the second processing element 1164 simultaneously access and read the same first input data. The first input data may be an activation value.

The PE pair 1160 may process operations in parallel using second input data and third input data, which are different weight data.

In one embodiment, the first processing element 1162 receives data belonging to an Nth column among weight matrices of an artificial neural network as input data, and the second processing element 1164 may receive data belonging to a column adjacent to the N (an (N+1)th column or an (N−1)th column) among the weight matrices of the artificial neural network as input data. Here, Nis an integer greater than or equal to zero. For example, the first processing element 1162 may be responsible for an operation corresponding to an odd column of an output matrix, and the second processing element 1164 may be responsible for an operation corresponding to an even column of the output matrix.

The first processing element 1162 reads the first input data from the first source buffer 1161, and reads the second input data from a second source buffer 1163 allocated to itself to perform an operation. The second source buffer 1163 may be included inside the first processing element 1162. In one embodiment, the first processing element 1162 may be responsible for an operation corresponding to an odd column of the output matrix.

The second processing element 1164 reads the first input data from the first source buffer 1161, and reads the third input data from a third source buffer 1165 existing inside the second processing element 1164 to perform an operation. In one embodiment, the second processing element 1164 may be responsible for an operation corresponding to an even column of the output matrix.

The first processing element 1162 and the second processing element 1164 are synchronized to the same clock to operate in parallel, and may perform operations independently of each other.

In one embodiment, the processing element pair may operate at a half clock obtained by lowering a master clock of a system-on-chip (SoC) by half. Accordingly, dynamic power consumption may be reduced by lowering a clock frequency. However, although an operation processing speed may decrease instead of reducing power consumption, two processing elements are synchronized and perform operations in parallel at the same time, thereby securing power efficiency without a decrease in processing speed.

In this embodiment, since the two processing elements share the first source buffer 1161, the same first input data can be loaded only once and commonly utilized, so register usage and the number of memory accesses are reduced, thereby improving power efficiency.

In addition, the second input data and the third input data currently loaded in the processing element pair 1160 may be transferred to another processing element pair and used for an operation in the other processing element pair. This data sharing structure between processing element pairs will be described later with reference to FIG. 10.

Ideally, power consumption is reduced by lowering and supplying a clock frequency, but performance degradation is avoided by operating a plurality of processing elements in parallel. However, if the number of processing elements increases, power consumption increases again by that amount. The shared structure of the first source buffer 1161 described above has an effect of suppressing an increase in the total area of the processing element pair. In one embodiment, when the number of processing elements is increased by two times, an area increases by almost two times because a separate buffer is required for each processing element in a structure that does not share the first input data. On the other hand, in a structure sharing the first source buffer as in the present disclosure, redundant configuration (e.g., register) for the corresponding buffer is removed, so an overall area increase ratio can be suppressed to a level of about 1.8 times. Accordingly, power consumption of the NPU 100 is significantly reduced as an operation clock frequency of the processing core 300 decreases, performance degradation due to a decrease in clock frequency is suppressed by adoption of a processing element pair in which a plurality of processing elements operate in parallel, and dilution of a power saving effect due to an increase in area according to an increase in the number of processing elements can be suppressed by sharing a source buffer.

A result of an operation performed in each processing element is stored in each independent accumulator 1166 and 1167. An operation result of the first processing element 1162 is stored in an accumulator corresponding to an odd column, and an operation result of the second processing element 1164 is stored in an accumulator corresponding to an even column, so that each column value of the output matrix is finally generated.

In addition, the second input data and the third input data stored in the second source buffer and the third source buffer may be transferred to a next processing element pair, and through this, data reuse is possible even between a plurality of processing element pairs. This data sharing structure between processing element pairs will be described later with reference to FIG. 10.

As such, the processing element pair 1160 shares the same first input data and performs an operation of the first input data and the second input data and an operation of the first input data and the third input data in parallel, thereby reducing data movement amount, improving area efficiency, and reducing power consumption without performance degradation.

Figure 10:
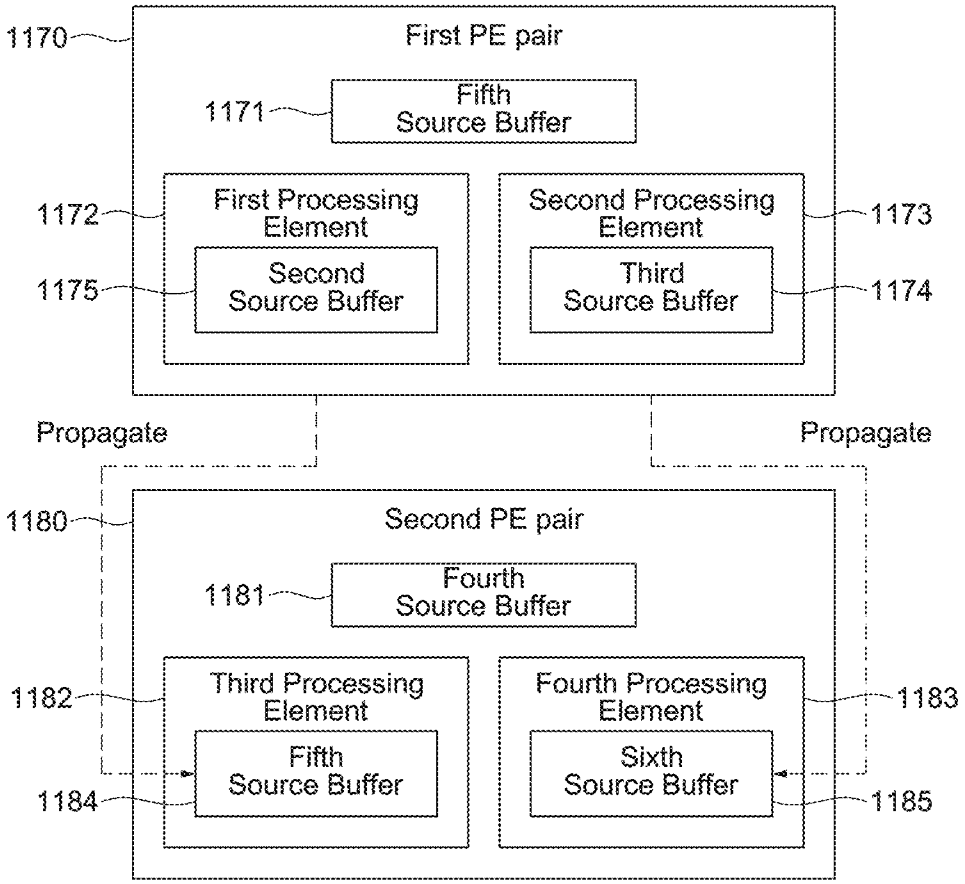
FIG. 10 is a diagram showing data sharing between processing pairs according to an embodiment of the present disclosure.

FIG. 10 shows data sharing between processing element pairs according to another embodiment of the present disclosure.

Referring to FIG. 10, a plurality of processing element pairs may be connected to each other and configured in a structure that sequentially transfers second input data. Through this, weight data loaded once can be reused in the plurality of processing element pairs, so that the number of memory accesses is minimized and power efficiency is improved.

The first processing element pair 1170 may include a first source buffer 1171, a first processing element 1172, and a second processing element 1173. The first source buffer 1171 is for storing first input data, and is shared by the first processing element 1172 and the second processing element 1173. The first processing element 1172 includes a second source buffer 1175 for storing second input data, and the second processing element 1173 may include a third source buffer 1174 for storing third input data.

The second processing element pair 1180 may include a fourth source buffer 1181, a third processing element 1182, and a fourth processing element 1183. The fourth source buffer 1181 is for storing fourth input data, and is shared by the third processing element 1182 and the fourth processing element 1183. The third processing element 1182 includes a fifth source buffer 1184 for storing fifth input data, and the fourth processing element 1183 may include a sixth source buffer 1185 for storing sixth input data.

In one embodiment, the second input data and the third input data stored in the first processing element pair 1170 may be propagated to the second processing element pair 1180.

Specifically, the second input data stored in the second source buffer 1175 is transferred to the fifth source buffer 1184 and used as the fifth input data, and the third input data stored in the third source buffer 1174 is transferred to the sixth source buffer 1185 and used as the sixth input data.

This data transfer structure operates in a manner similar to a systolic array, and weight data flows sequentially along the processing element pairs and is reused in each pair. The systolic array structure is a pipeline structure in which data is transferred in a regular direction and sequentially consumed in each operation block, and is a structure allowing identical data to be reused in several operation nodes. Through this, since there is no need to repeatedly read the same weight data from a memory, memory bandwidth usage is minimized, and power consumption due to data movement is significantly reduced.

In one embodiment, the processing core 300 may include a plurality of processing element pairs, and each processing element pair may operate in a manner of receiving weight data from a previous pair, performing an operation, and then transferring the same weight data to a next pair. Through such a chain-type data transfer structure, a large-scale matrix multiplication operation can be efficiently performed.

In addition, as described in FIG. 10, inside each processing element pair, the first source buffer is shared so that the first input data (activation value) is reused, and between processing element pairs, the second input data (weight data) is transferred and reused.

As such, the present disclosure can minimize memory access and maximize power efficiency through a dual data reuse structure of an intra-PE pair and an inter-PE-pair. In addition, the data sharing and transfer structure between the plurality of processing element pairs minimizes memory bandwidth usage, significantly reduces power consumption due to data movement, and allows a large-scale matrix multiplication operation to be efficiently performed. A specific embodiment of the dual data reuse structure between processing element pairs (inter-PE-pairs) will be described later.

Figure 11:
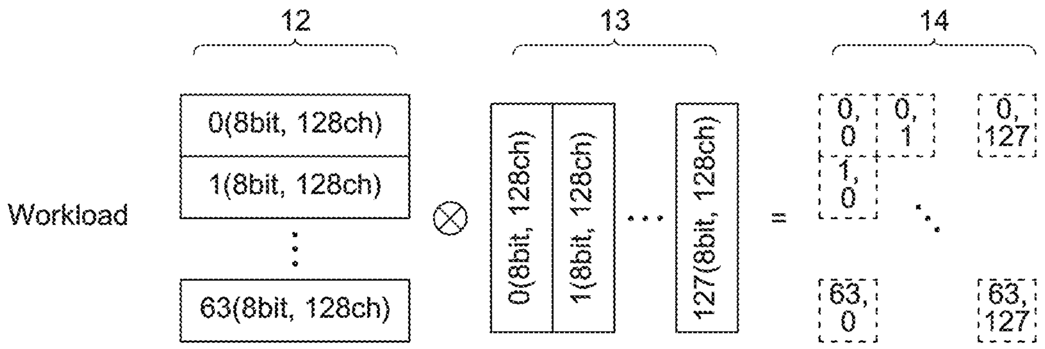
FIG. 11 is a diagram showing a workload of an 8-bit mode in which both operand data A and operand data W are 8 bits according to an embodiment of the present disclosure.

FIG. 11 shows a workload of an 8-bit mode in which both operand data (e.g., activation value) and operand data (e.g., weight) are 8 bits according to an embodiment of the present disclosure.

The processing core 300 may matrix multiply operand data 12 and operand data 13 to obtain an operation result 14. According to a representative embodiment, the operand data 12 may be an activation value, and the operand data 13 may be a weight, but are not limited thereto. In the embodiment of FIG. 11, individual activation values are in an 8-bit format and individual weight values are in an 8-bit format.

Referring to FIG. 11, each of the plurality of processing element pairs of the processing core 300 may be configured to process two portions of operand data 13 in parallel for one portion of operand data 12. In an operation in units of processing element pairs, one portion of operand data 12 may mean one row of the operand data 12, and two portions of operand data 13 may mean two columns of the operand data 13.

The operand data 12 is shared inside the processing element pair, and the first and second processing elements included in the corresponding pair may parallelly process the operand data 13 corresponding to an even index weight column and an odd index weight column, respectively. Through this, in an operation mode (hereinafter, referred to as an 8-bit mode) in which the operand data 13 input to the processing element pair is 8 bits and an 8 bit×8 bit operation is performed, a multiplication operation on two portions of operand data 13 may be performed in parallel for one portion of operand data 12.

According to an embodiment, a current workload of the processing core 300 may include total 64 rows of operand data 12 (8 bit, 128ch) from a 0th row to a 63rd row. Such operand data 12 may be subjected to a multiplication operation with operand data (W, 13). The operand data (W, 13) consists of total 128 columns from a 0th column to a 127th column, and each column consists of data of 8 bits and 128 channels.

The processing core 300 may obtain an output matrix of a 64×128 size as a result 14 of the matrix multiplication operation. For example, a value at a (0,0) position of the output matrix is obtained by performing multiplication of a 0th row of the operand data (A, 12) and a 0th column of the operand data (W, 13), and a value at a (63, 127) position of the output matrix may be obtained by performing multiplication of a 63rd row of the operand data (A, 12) and a 127th column of the operand data (W, 13).

Each of FIGS. 12 to 16 illustrates an operation in which the processing core 300 performs the workload of FIG. 11 according to a pipeline processing method while sharing data between processing pairs in the case of the 8-bit mode according to an embodiment.

Inside the processing element pairs of FIGS. 12-16 and FIGS. 18-22, processing elements exist in pairs, and it will be described that the processing elements each have a source buffer storing weight data.

Figure 12:
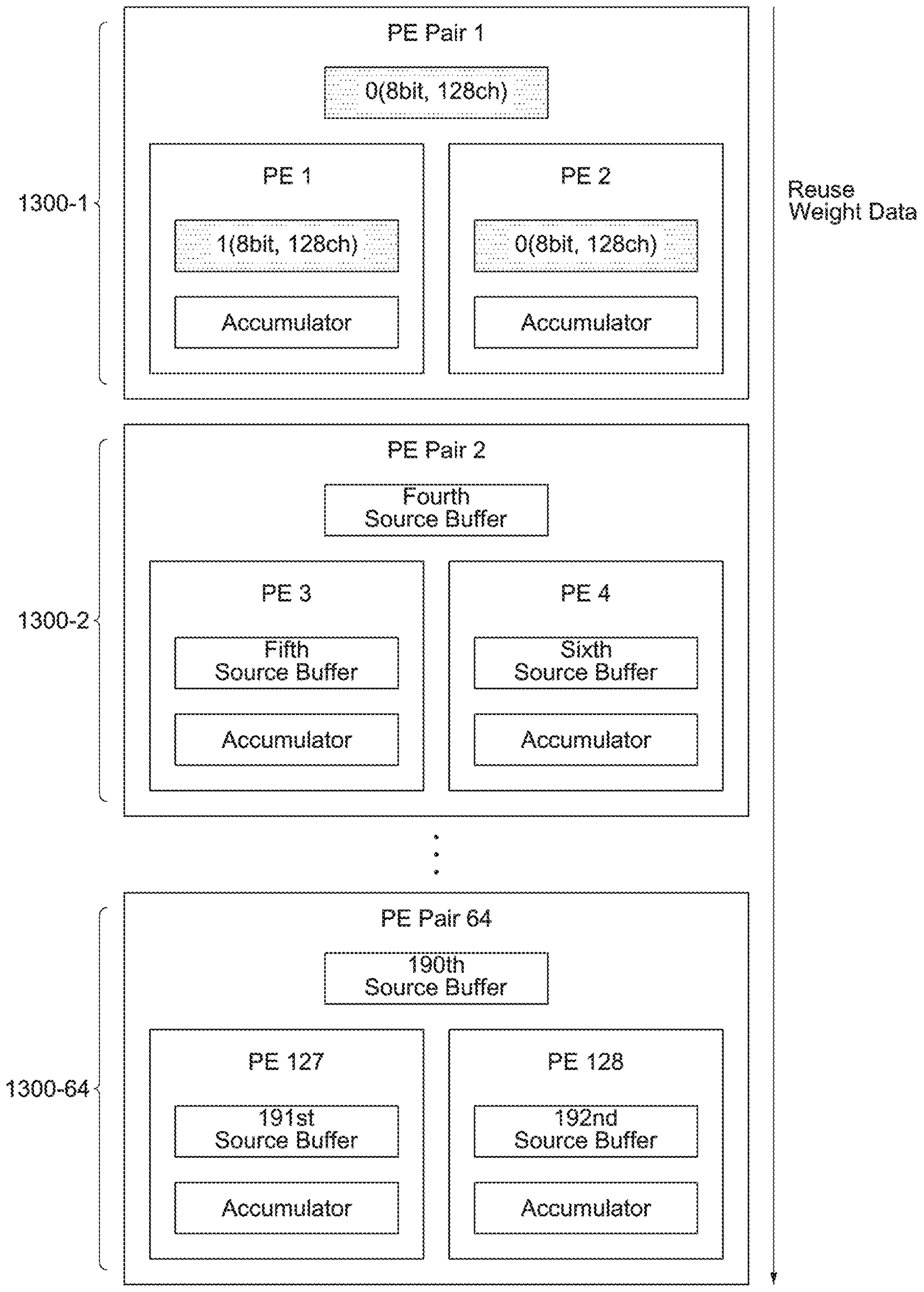
FIG. 12 to FIG. 16 are diagrams of structures respectively showing data sharing between processing pairs when a weight is 8 bits according to an embodiment of the present disclosure.

FIG. 12 illustrates a first step of a weight data processing cycle for processing the workload shown in FIG. 11.

Referring to FIG. 12, a first PE pair 1300-1 (PE pair 1) loads a 0th activation value (0 (8 bit, 128ch)) into a first source buffer. A first processing element PE1 shares the 0th activation value (0 (8 bit, 128ch)) with a second processing element PE2.

First weight data (1 (8 bit, 128ch)) is loaded into a second source buffer included in the first processing element PE1, and 0th weight data (0 (8 bit, 128ch)) is loaded into a third source buffer included in the second processing element PE2. In the 8-bit mode of the present disclosure, the processing element pair shares the same activation value and loads two portions of weight data corresponding to an even index and an odd index, so that each of the processing elements belonging to the processing element pair may perform a multiplication operation on weight data of an index allocated to itself.

At this time, processing element pairs after the first processing element pair maintain an initial state where weight data is not yet loaded.

Figure 13:
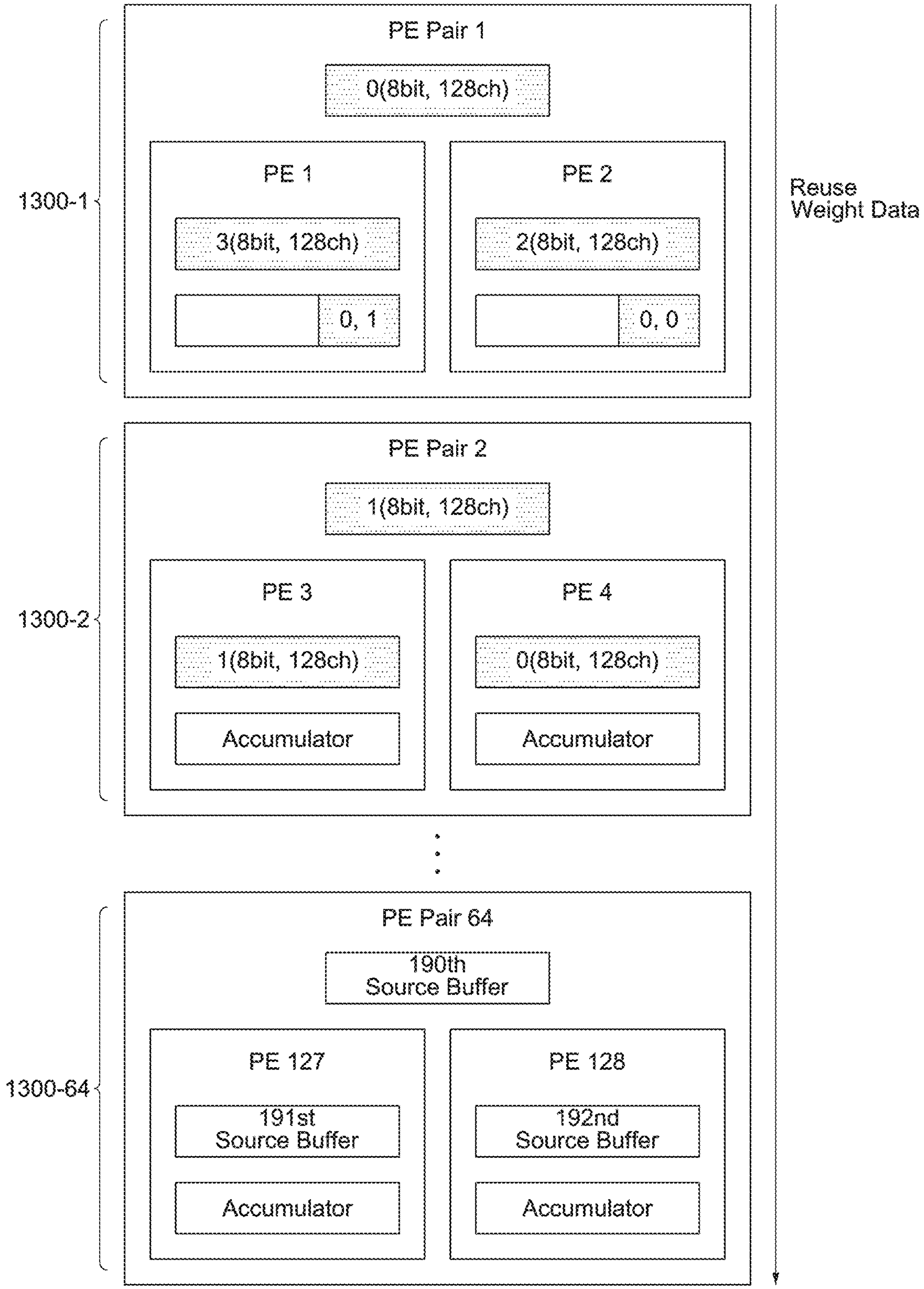

FIG. 13 illustrates when data starts to be transferred to a second PE pair 1300-2 (PE pair 2).

The PE pair 1 maintains the 0th activation value (0 (8 bit, 128ch)) loaded in the first source buffer as it is, and a first activation value (1 (8 bit, 128ch)) for a next operation may be newly loaded into a source buffer (e.g., a fourth source buffer) of the PE pair 2.

At this time, weight data already used for an operation are transferred to a processing element pair of a next operation order, so that a third processing element of the PE pair 2 may receive the first weight data (8 bit, 128ch) from the PE pair 1, and a fourth processing element may receive the 0th weight data (8 bit, 128ch) from the PE pair 1. At this time, first operation results (0,1) and (0,0) obtained by accumulating multiplication results are stored in an accumulator of the PE pair 1.

Figure 14:
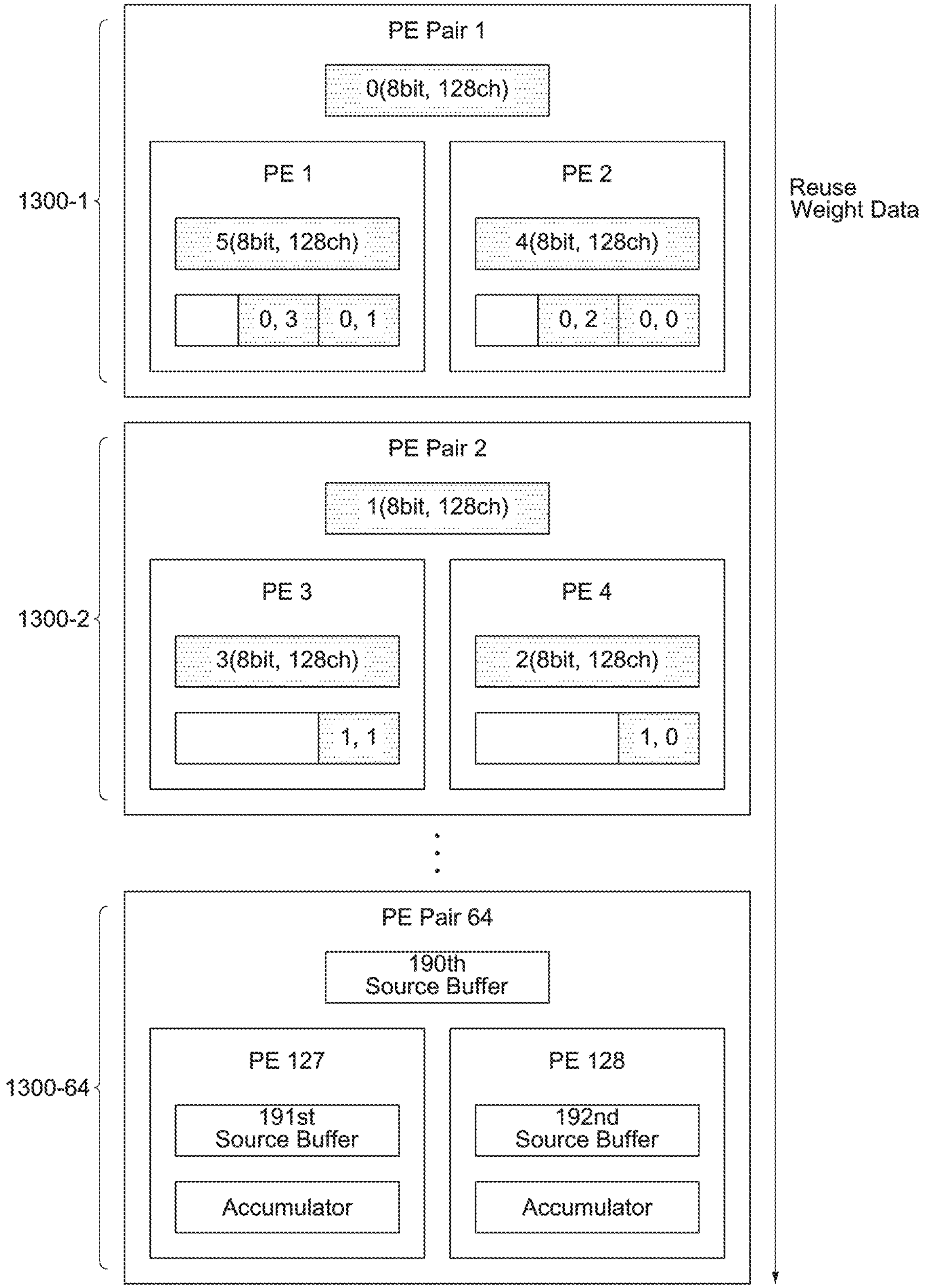

FIG. 14 illustrates a process in which weight data used for an operation is transferred to a subsequent processing element pair.

The PE pair 1 loads a new weight data set (5 (8 bit, 128ch), 4 (8 bit, 128ch)) required for a subsequent operation into the second and third source buffers while maintaining the 0th activation value (0 (8 bit, 128ch)) in the first source buffer, and performs a next multiplication operation.

The second and third weight data previously used in the PE pair 1 are transferred to the PE pair 2, and are sequentially stored and used for operation in the third processing element and the fourth processing element of the PE pair 2, respectively.

In addition, the first and 0th weight data used in the PE pair 2 are transferred to a processing element pair of a subsequent operation order.

At this point, partial sums of (0,3), (0,2), (0,1), and (0,0) may be accumulated and stored in the accumulator of the PE pair 1, and partial sums such as (1,0) and (1,1) may be accumulated and stored in an accumulator of the PE pair 2.

Figure 15:
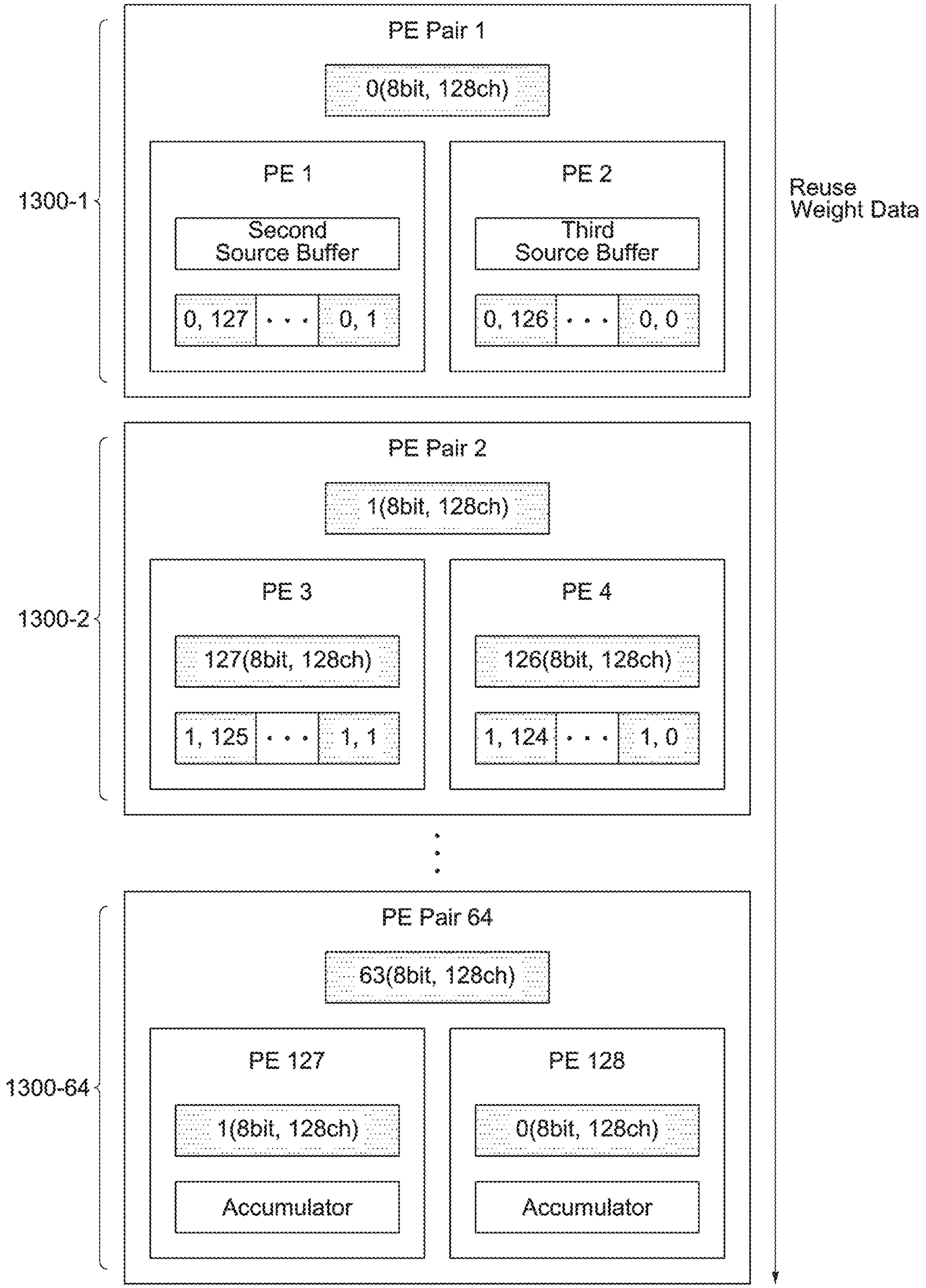

FIG. 15 shows a state in which weight data is transferred to a subsequent processing element pair and simultaneously each processing element pair performs an operation based on different weight data.

Referring to FIG. 15, the PE pair 1 is in a state where operations for columns (e.g., columns 0 to 127) of the operand data 13 already handled in FIGS. 12 to 14 are completed, and no additional weight data is loaded and no further multiplication operation is performed at this point.

That is, the PE pair 1 at this point has completed its role in the corresponding operation cycle, and in a subsequent step, the PE pair 2 continues to perform an operation using the transferred weights.

The PE pair 2 of FIG. 15 performs a multiplication operation on the first activation value (1 (8 bit, 128ch)) based on the 127th and 126th weight data (127 (8 bit, 128ch), 126 (8 bit, 128ch)) transferred from the PE pair 1 in FIGS. 13 and 14.

In addition, the first weight data and the 0th weight data are transferred to a 64th PE pair 1300-64 (PE pair 64) to perform an operation like the above-described processing element pairs, and store an operation result in an accumulator.

The accumulator state identified in FIG. 15 indicates that more elements of the output matrix are being filled as time (e.g., timestep) progresses.

For example, result values obtained by performing operations of the 0th weight data to the 127th weight data with the 0th activation value, such as (0,0), (0,1), . . . , (0,127), may be stored in the accumulator of the PE pair 1 of FIG. 15. In addition, result values obtained by performing operations of the 0th weight data to the 125th weight data with the first activation value, such as (1,0), (1,1), . . . , (1,125), may be stored in the accumulator of the PE pair 2.

Figure 16:
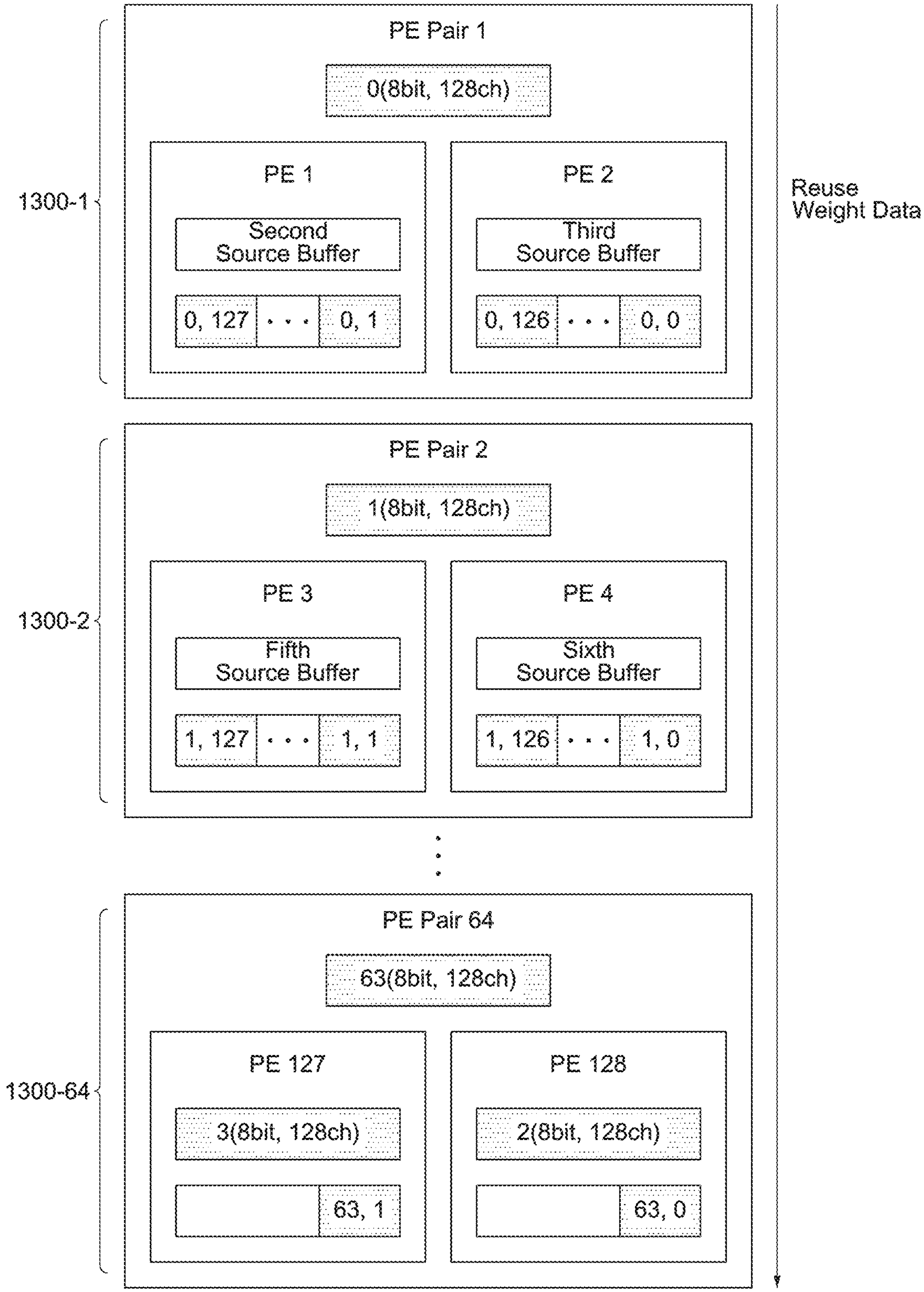

FIG. 16 shows an operation of processing element pairs in an operation process after FIG. 15.

In particular, weight data is sequentially transferred (systolic propagation) between processing element pairs as in the previous steps and reused, and each processing element pair performs an operation on an activation value corresponding to itself and stores the result in an accumulator.

At this time, the PE pair 2 may also be in a state where operations for all weights are completed. At this time, result values obtained by performing operations of the 0th weight data to the 127th weight data with the first activation value, such as (1,0), (1,1), . . . , (1,127), may be stored in the accumulator of the PE pair 2.

In addition, the PE pair 64 of FIG. 16 may perform a multiplication operation on a 63rd activation value (63 (8 bit, 128ch)) using the transferred third and second weight data, and store a partial sum generated as a result thereof in an accumulator. When the PE pair 64 completes parallel operations on the 63rd activation value (63 (8 bit, 128ch)) and the 127th weight data and the 126th weight data, the entire operation for the workload may be terminated.

FIGS. 11 to 16 described above illustrate a process in which an entire matrix operation is performed step by step according to a pipeline method, and show an operation in which each processing element pair performs an operation corresponding to a column of a different weight matrix, thereby sequentially generating values of an output matrix. In addition, weight data is transferred to a lower processing element pair by systolic propagation, and each processing element pair multiplies the transferred weight data by an activation value without separate memory access and accumulates it in an accumulator, so that a result in a column direction of an output matrix can be sequentially calculated. In FIGS. 12-16, shaded boxes indicate system components that are active or participating in a corresponding operation step and unshaded boxes indicate system components that are not participating in the corresponding operation step.

Figure 17:
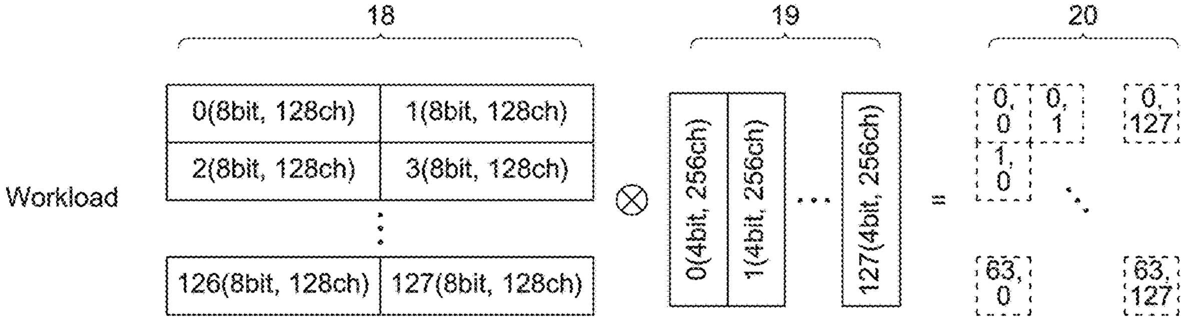
FIG. 17 is a diagram showing a workload of a 4-bit mode in which operand data A is 8 bits and operand data W is 4 bits according to an embodiment of the present disclosure.

FIG. 17 shows a workload of a 4-bit mode in which operand data (e.g., activation value) is 8 bits and operand data (e.g., weight) is 4 bits according to an embodiment of the present disclosure.

The processing core 300 may matrix multiply operand data 18 and operand data 19 to obtain an operation result 20. According to a representative embodiment, the operand data 18 is an activation value, and the operand data 19 may be a weight, but are not limited thereto. In the embodiment of FIG. 17, individual activation values are in an 8-bit format and individual weight values are in a 4-bit format.

Referring to FIG. 17, each of the plurality of processing element pairs of the processing core 300 may be configured to process two portions of operand data 19 in parallel for one portion of operand data 18 even when the operand data 19 is 4 bits. In an operation in units of processing element pairs, one portion of operand data 18 may mean one row of the operand data 18, and two portions of operand data 19 may mean two columns of the operand data 19.

One portion of operand data (A, 18) consists of a vector of 256 channels of an 8-bit size. This is configured by loading two 8-bit 128-channel activation values from a memory and combining them in a channel direction. In the entire workload, a total of 128 portions of such operand data 18 exist from a 0th to a 127th, and each consists of a vector of 8 bits and 128 channels. In FIG. 17, by grouping two portions of first input data into one row, it can be expressed as a total of 64 rows.

This reflects a structure in which the first processing element PE1 and the second processing element PE2 included in each processing element pair share the same operand data 18 inside the pair and share and perform parallel operations on weight data 19 corresponding to an even index and an odd index in the 4-bit mode.

In one embodiment, the first processing element PE1 and the second processing element PE2 may verify operand data 19 corresponding to an even index column and an odd index column based on the shared operand data 18, respectively, and perform a multiplication operation corresponding to each index in parallel.

The matrix of the operand data 19 has a total of 128 columns from a 0th to a 127th, and each column consists of data of 4 bits and 256 channels. The result 20 of the matrix multiplication operation may generate an output matrix of a 64×128 size.

For example, a value at a (0,0) position of the output matrix 20 is obtained by performing multiplication of the operand data 18 of a 0th row and a 0th column of a matrix composed of the operand data 19, and a value at a (63, 127) position of the output matrix 20 may be obtained by performing multiplication of the operand data (A, 18) of a 63rd row and a 127th column of the matrix composed of the operand data (W, 19).

Figure 18:
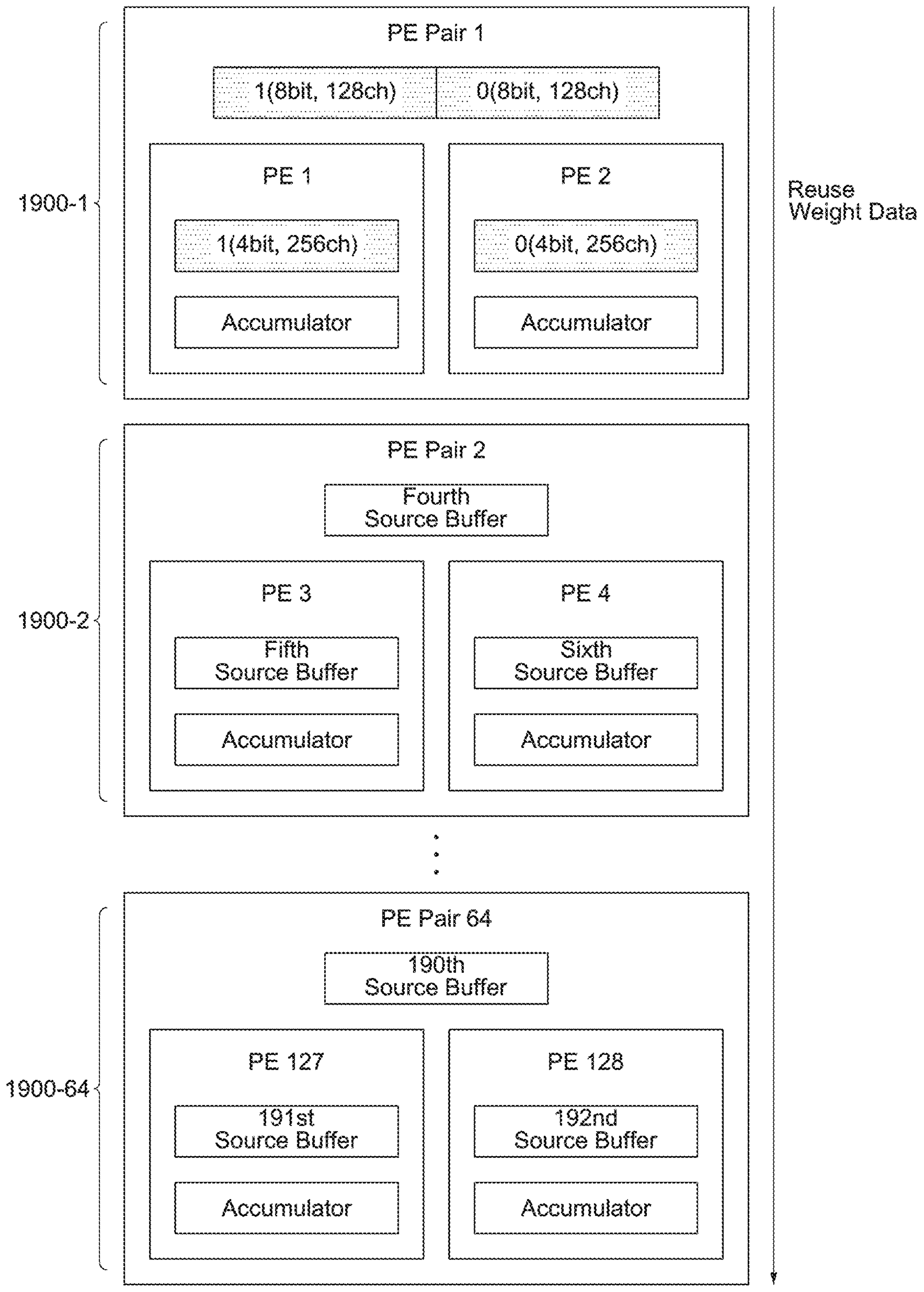
FIG. 18 to FIG. 22 are diagrams of structures respectively showing data sharing between processing pairs when a weight is 4 bits according to an embodiment of the present disclosure.

Each of FIGS. 18 to 22 illustrates an operation in which the processing core 300 performs the workload of FIG. 17 according to a pipeline processing method while sharing data between processing pairs in the case of the 4-bit mode according to an embodiment of the present disclosure. In FIGS. 18-16, shaded boxes indicate system components that are active or participating in a corresponding operation step and unshaded boxes indicate system components that are not participating in the corresponding operation step.

FIG. 18 illustrates a first step of a data processing cycle when a weight is 4 bits according to an embodiment of the present disclosure.

Referring to FIG. 18, a first PE pair 1900-1 (PE pair 1) loads a 0th activation value (0 (8 bit, 128ch)) and a first activation value (1 (8 bit, 128ch)) into a first source buffer, and first weight data (1 (4 bit, 256ch)) and 0th weight data (0 (4 bit, 256ch)) are loaded into source buffers inside a first processing element PE1 and a second processing element PE2, respectively.

At this time, the 0th activation value and the first activation value loaded into the first source buffer are combined in a channel direction to constitute an activation value of 256 channels, and the first processing element PE1 and the second processing element PE2 may share the activation value inside the pair.

In one embodiment, the first processing element PE1 performs an operation with the first weight data (1 (4 bit, 256ch)) of an odd index, and the second processing element PE2 may perform an operation with the 0th weight data (0 (4 bit, 256ch)) of an even index.

Meanwhile, processing element pairs after the first processing element pair maintain an initial state where weight data is not yet loaded.

Figure 19:
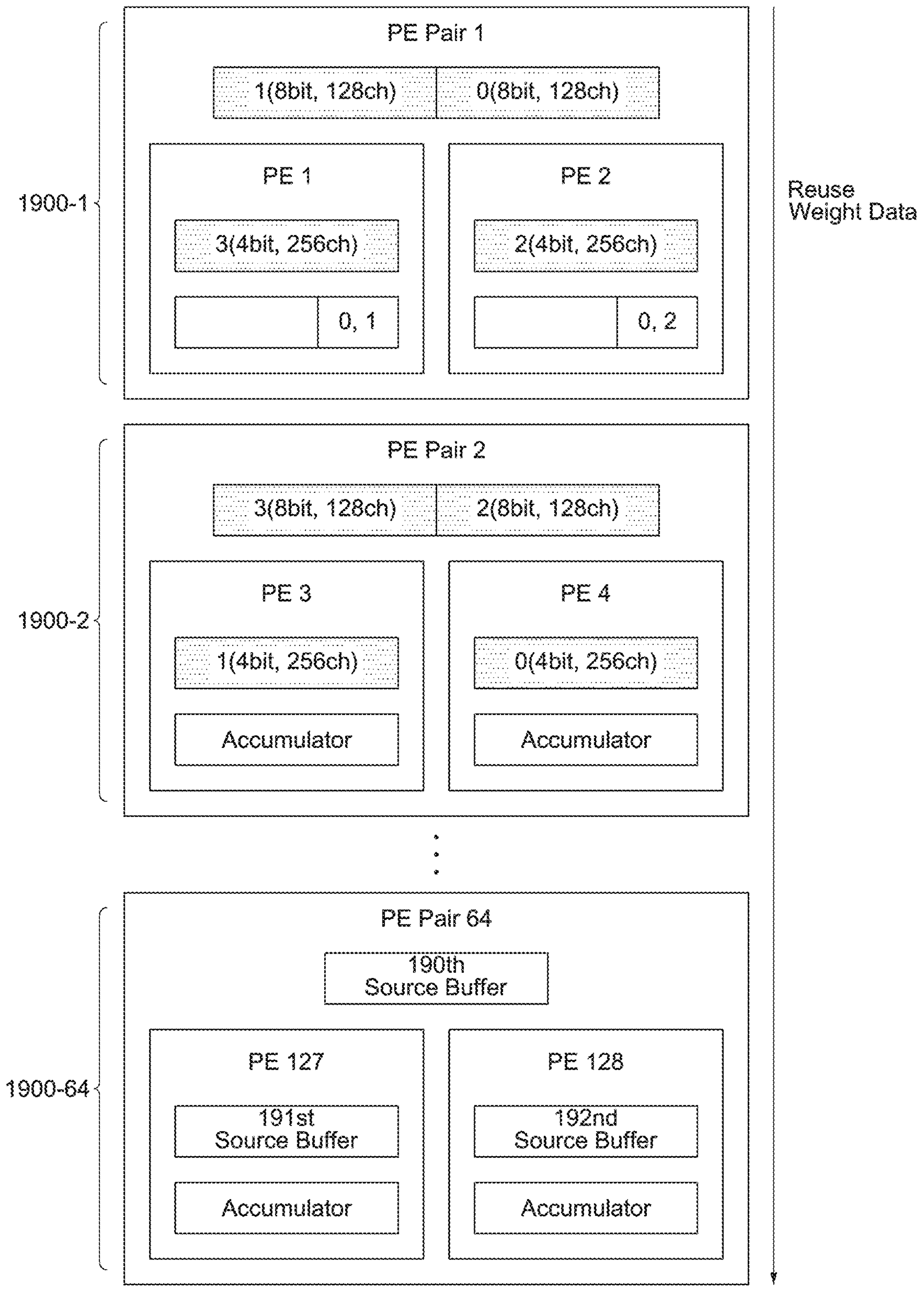
Figure 20:
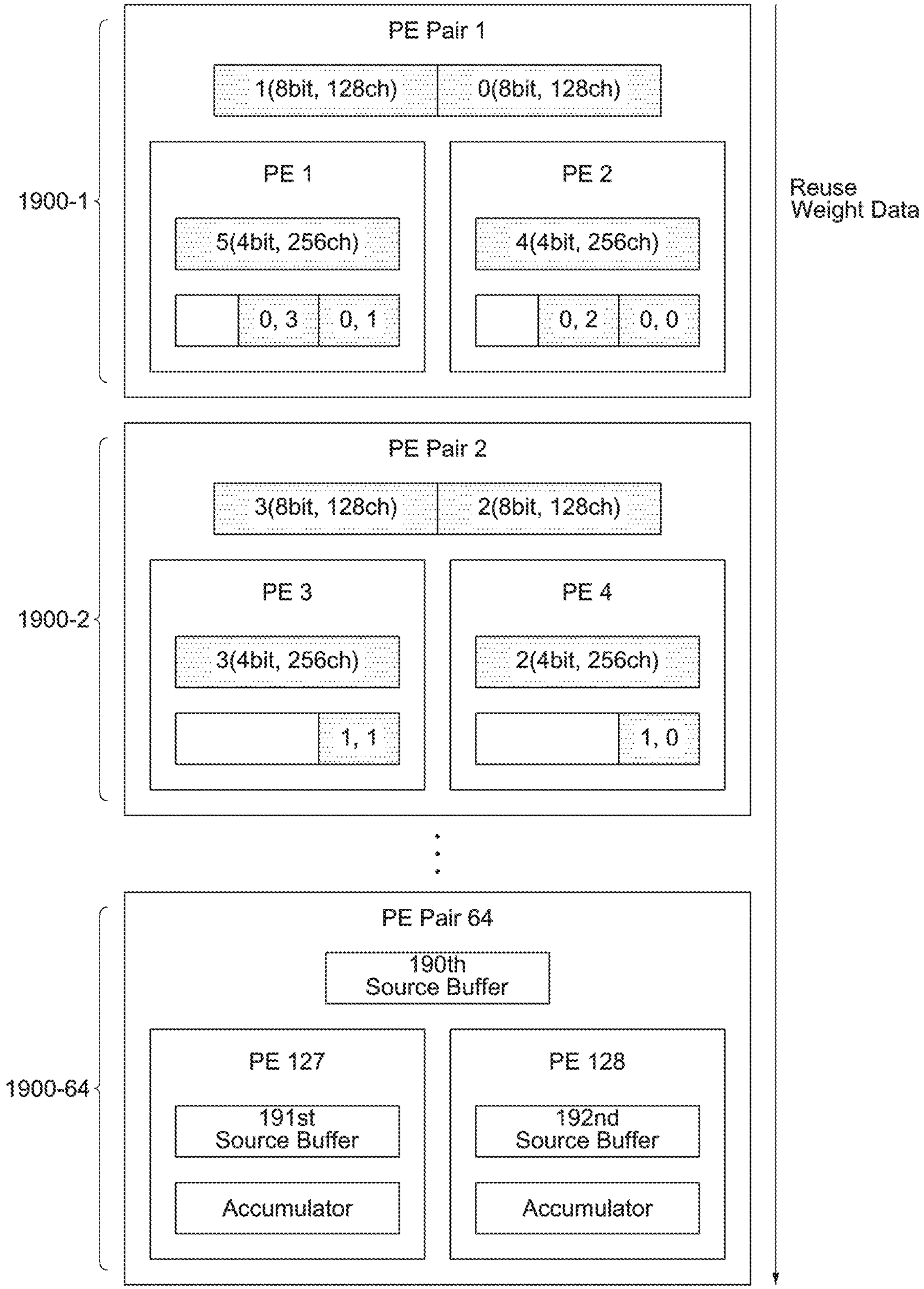

FIG. 19 and FIG. 20 each illustrate the same step of the data-sharing operation, in which weight data starts to be transferred to a next processing element pair after the operation of FIG. 18, which includes a second PE pair 1900-2 (PE pair 2) through a 64th PE pair 1900-64 (PE pair 64).

Referring to FIG. 19, the first PE pair 1900-1 loads second weight data (2 (4 bit, 256ch)) and third weight data (3 (4 bit, 256ch)), which are new weight data, to perform an additional operation, and the second PE pair 1900-2 may load second and third activation values into a fourth source buffer and perform an operation with transferred weight data. At this time, each operation result is stored in an accumulator.

In addition, the 0th weight data (0 (4 bit, 256ch)) and the first weight data (1 (4 bit, 256ch)) used in the first PE pair 1900-1 are transferred to the second PE pair 1900-2. The second PE pair 1900-2 may perform an operation on the transferred weight data with the second and third activation values and store it in an accumulator.

In FIG. 20 as well, the first PE pair 1900-1 continuously loads a new weight to perform an operation, and transfers weight data performed in the operation to the second PE pair 1900-2 of a next order.

For example, in the second PE pair 1900-2, a second activation value (2 (8 bit, 128ch)) and a third activation value (3 (8 bit, 128ch)) are combined in a channel direction to constitute a 256-channel activation value, a third processing element performs an operation with weight data of an odd index column, and a fourth processing element may perform an operation with weight data of an even index column.

When the operation is terminated, the second PE pair 1900-2 also transfers used weight data to a processing element pair of a next order.

Subsequently, in FIG. 21, the first PE pair 1900-1 has already completed all allocated operations and does not perform additional operations.

As described above, the second PE pair 1900-2 performs an operation using the transferred weight, and the result is stored in an accumulator. The same operation is also performed by a 64th PE pair 1900-64, and through this, various positions of an output matrix are sequentially filled.

Figure 21:
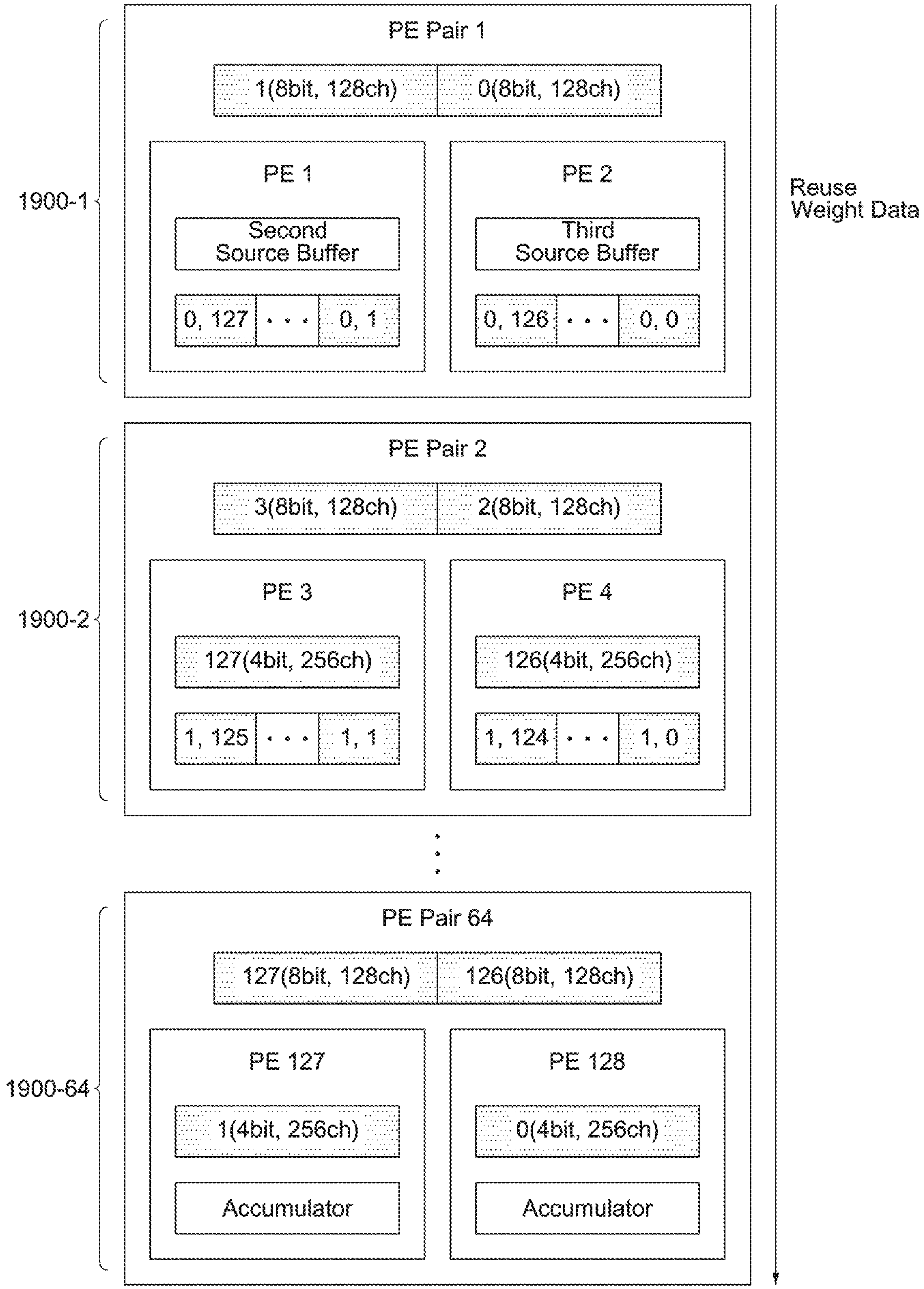

FIG. 21 shows a state in which each processing element pair performs an operation using a weight transferred to itself and stores an incremented result in an accumulator in a step immediately before an entire operation flow is terminated.

At this point, each processing element pair accumulates a large number of result values corresponding to specific activation values, and these accumulated result values constitute positions of the output matrix.

Figure 22:
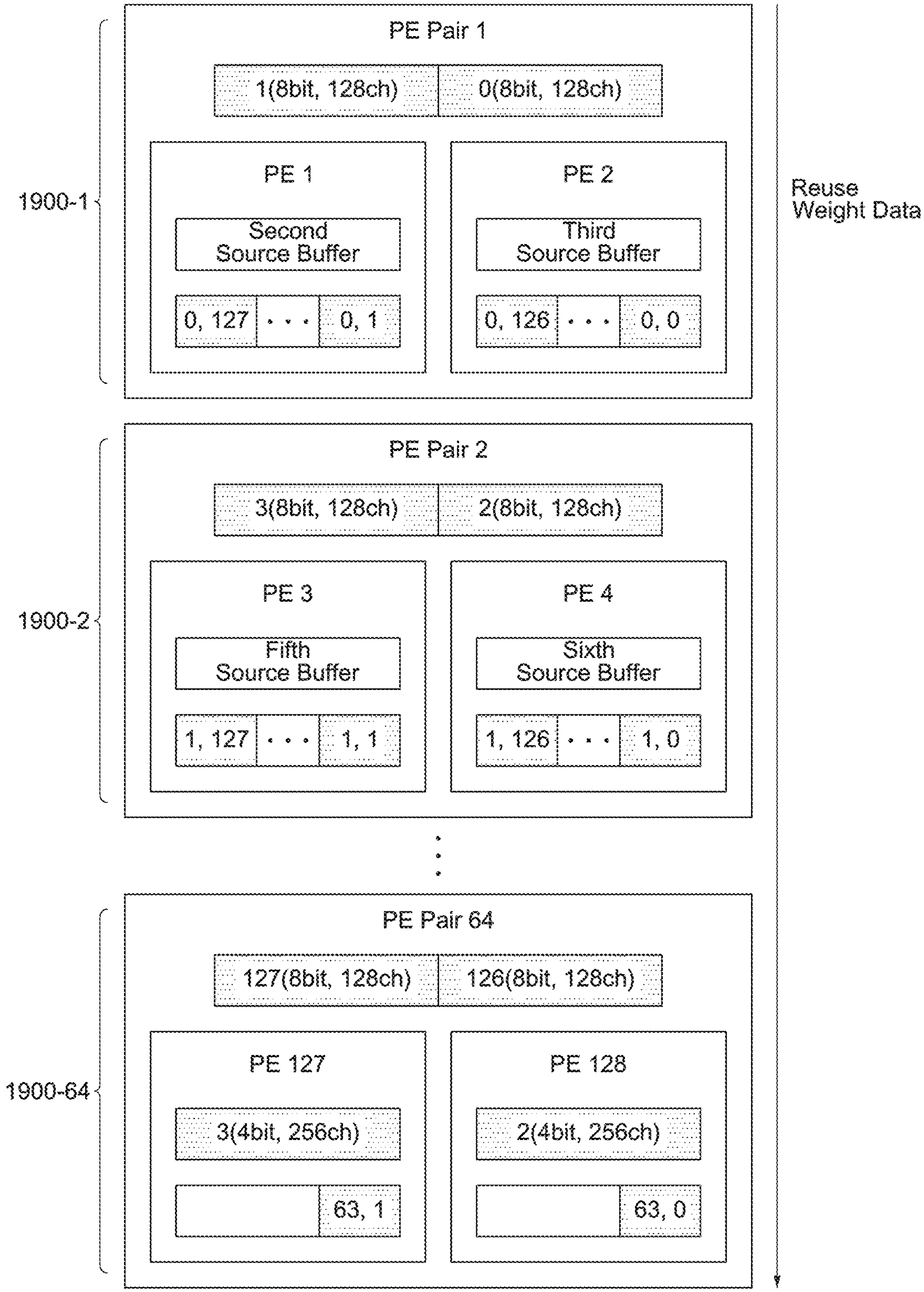

Referring to FIG. 22, the second PE pair 1900-2 can also complete all allocated operations and store operation results in an accumulator. When the 64th PE pair 1900-64 completes parallel operations on a 126th activation value (126 (8 bit, 128ch)) and a 127th activation value (127 (8 bit, 128ch)) and 127th weight data and 126th weight data, the entire operation for the workload may be terminated. At this point, all positions of the output matrix are determined.

Therefore, FIGS. 17 to 22 pertain to a process in which an entire matrix operation is performed step by step according to a pipeline method, and specifically show an entire processing flow of completing an output matrix by performing a cumulative multiplication operation with activation data while weight data is sequentially transferred between processing element pairs.

In addition, weight data is transferred to a lower processing element pair in a systolic structure, and each processing element pair multiplies the transferred weight by activation data without additional memory access and stores it in an accumulator, so that operation efficiency can be improved.

The examples of the present disclosure disclosed in the present specification and drawings are merely presented as specific examples to easily explain the technical content of the present disclosure and help understanding of the present disclosure, and are not intended to limit the scope of the present disclosure. It will be apparent to those skilled in the art to which the present disclosure belongs that other modifications based on the technical idea of the present disclosure can be implemented in addition to the examples disclosed herein.

What is claimed is:

1. A processing core included in a neural processing unit for performing a matrix multiplication operation, the processing core comprising:

a plurality of processing element (PE) pairs including a first PE pair and a second PE pair, wherein each of the plurality of PE pairs includes:

a first processing element for performing configured to perform a multiplication operation of first input data and second input data;

a second processing element configured to perform a multiplication operation of the first input data and third input data in parallel with the first processing element;

a first source buffer configured to load the first input data, the first source buffer shared by the first processing element and the second processing element;

a second source buffer included in the first processing element, the second source buffer configured to store the second input data; and a third source buffer included in the second processing element, the third source buffer configured to store the third input data, wherein the second input data stored in the second source buffer of the first PE pair is transferred to the second source buffer of the second PE pair, and wherein the third input data stored in the third source buffer of the first PE pair is transferred to the third source buffer of the second PE pair.

2. The processing core of claim 1, wherein the second PE pair includes:

a third processing element for performing a multiplication operation of fourth input data and fifth input data;

a fourth processing element for performing a multiplication operation of the fourth input data and sixth input data in parallel with the third processing element; and a fourth source buffer for loading the fourth input data, the fourth source buffer shared by the third processing element and the fourth processing element, and wherein the third processing element includes a fifth source buffer for loading the fifth input data, wherein the fourth processing element includes a sixth source buffer for loading the sixth input data, wherein the second source buffer, the third source buffer, the fifth source buffer, and the sixth source buffer are separate source buffers, wherein the second source buffer and the fifth source buffer are included in different processing elements and are connected by a first transfer path, and wherein the third source buffer and the sixth source buffer are included in different processing elements and are connected by a second transfer path separate from the first transfer path.

3. The processing core of claim 2, wherein the fifth source buffer receives the second input data stored in the second source buffer and stores the received second input data as the fifth input data, and wherein the sixth source buffer receives the third input data stored in the third source buffer and stores the received third input data as the sixth input data.

4. The processing core of claim 1, wherein the first input data is an activation value, and wherein the second input data and the third input data are weight values of an artificial neural network.

5. The processing core of claim 4, wherein the first input data is at least one value corresponding to an Nth row of a first operand data matrix composed of activation values of an 8-bit format, wherein the second input data is at least one value corresponding to an Mth column of a second operand data matrix composed of weight values of a 4-bit or 8-bit format, and wherein the third input data is at least one value corresponding to a column adjacent to the Mth column of the second operand data matrix.

6. The processing core of claim 1, wherein at least one of the first input data, the second input data, or the third input data comprises an integer parameter obtained by quantizing floating-point data having a floating-point format selected from Brain Floating-Point 16 (BF16), TensorFloat-32 (TF32), 8-bit Floating-Point (FP8), and Block Floating Point (BFP).

7. The processing core of claim 6, wherein the processing core is configured to perform integer arithmetic operations and to exclude floating-point parameter operations, floating-point data being converted to integer data before being processed by the processing core.

8. The processing core of claim 6, wherein each processing element of the processing core is designed to process an integer parameter, wherein the quantizing is performed by a special function unit of the neural processing unit, and wherein the floating-point format is FP8 or BFP.

9. A system-on-chip (SoC) for performing an artificial intelligence inference operation, the SoC comprising:

a neural processing unit including a plurality of processing element (PE) pairs configured to perform matrix multiplication; and a host processor configured to control the neural processing unit, wherein each PE pair of the plurality of PE pairs includes:

a first processing element configured to perform a multiplication operation of first input data and second input data;

a second processing element configured to perform a multiplication operation of the first input data and third input data in parallel with the first processing element;

a first source buffer configured to load the first input data, the first source buffer shared by the first processing element and the second processing element;

a second source buffer included in the first processing element, the second source buffer configured to store the second input data; and a third source buffer included in the second processing element, the third source buffer configured to store the third input data, and wherein the SoC is configured to reuse operand data by transferring the second input data stored in the second source buffer of the first PE pair to the second source buffer of the second PE pair for use as operand data in the second PE pair and by transferring the third input data stored in the third source buffer of the first PE pair to the third source buffer of the second PE pair for use as operand data in the second PE pair.

* * * * *